(12) United States Patent
Jung et al.

(10) Patent No.: US 12,016,495 B2
(45) Date of Patent: *Jun. 25, 2024

(54) BLENDER

(71) Applicant: LG ELECTRONICS INC., Seoul (KR)

(72) Inventors: Sangjin Jung, Seoul (KR); Daeyong Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,226

(22) Filed: Apr. 25, 2023

(65) Prior Publication Data

US 2023/0263342 A1    Aug. 24, 2023

Related U.S. Application Data

(62) Division of application No. 17/003,100, filed on Aug. 26, 2020, now Pat. No. 11,666,181.

(30) Foreign Application Priority Data

Aug. 29, 2019    (KR) ......................... 10-2019-0106705

(51) Int. Cl.
    *A47J 43/00*    (2006.01)
    *A47J 43/07*    (2006.01)
    *A47J 43/08*    (2006.01)

(52) U.S. Cl.
    CPC ......... *A47J 43/0722* (2013.01); *A47J 43/085* (2013.01)

(58) Field of Classification Search
    CPC ........................... A47J 43/0722; A47J 43/085
    See application file for complete search history.

(56) References Cited

U.S. PATENT DOCUMENTS

| 11,666,181 B2* | 6/2023 | Jung ................... A47J 43/0722 366/205 |
| 2007/0103884 A1 | 5/2007 | Popowich et al. |
| 2007/0119484 A1 | 5/2007 | Kwon et al. |
| 2013/0271950 A1 | 10/2013 | Park |

(Continued)

FOREIGN PATENT DOCUMENTS

| CN | 201996263 U | 10/2011 |
| CN | 208570410 U | 3/2019 |

(Continued)

*Primary Examiner* — Anshu Bhatia
(74) *Attorney, Agent, or Firm* — Bryan Cave Leighton Paisner LLP

(57) ABSTRACT

The present disclosure relates to a blender including a main body including an outer case forming an outer appearance and an inner case configured to be received inside the outer case, a jar configured to be seated on the main body and provided with a blade device for crushing food, a motor assembly provided inside the inner case and configured to generate rotation power of the blade device, a main PCB device which is provided inside the inner case and on which a knob rotation shaft is mounted to input rotation of the knob rotation shaft, a knob assembly mounted on the knob rotation shaft and protruding outwardly through the outer case so that the operation of the knob assembly is manipulated by a user for operation manipulation of the motor assembly, and a supporter provided inside the inner case and supporting the main PCB device.

20 Claims, 23 Drawing Sheets

(56) References Cited

U.S. PATENT DOCUMENTS

| | | | | |
|---|---|---|---|---|
| 2014/0078855 A1* | 3/2014 | Lee | ............... | A47J 43/0722 |
| | | | | 366/142 |
| 2015/0069157 A1* | 3/2015 | Wulf | ............... | A47J 43/06 |
| | | | | 366/205 |
| 2015/0117141 A1 | 4/2015 | Brotzki | ............... | B01F 35/3204 |
| | | | | 366/205 |
| 2015/0315737 A1 | 11/2015 | Yang | | |
| 2018/0206677 A1 | 7/2018 | Ivarsson et al. | | |
| 2019/0090694 A1* | 3/2019 | Wu | ............... | A47J 43/0716 |

FOREIGN PATENT DOCUMENTS

| | | |
|---|---|---|
| CN | 208740780 U | 4/2019 |
| DE | 10 2006 023959 A1 | 1/2007 |
| EP | 2650422 A1 | 10/2013 |
| EP | 2865303 A1 | 4/2015 |
| EP | 2937455 A1 | 10/2015 |
| EP | 3735881 A1 | 11/2020 |
| WO | 2015/054817 A1 | 4/2015 |
| WO | 2017/063962 A1 | 4/2017 |

\* cited by examiner

BLENDER

CROSS-REFERENCE TO PRIOR APPLICATIONS

This application is a Divisional Application of U.S. patent application Ser. No. 17/003,100, filed Aug. 26, 2020, which claims priority to Korean Application No. 10-2019-0106705, filed on Aug. 29, 2019, the contents of which are hereby incorporated by reference herein in their entirety.

BACKGROUND

The present disclosure relates to a blender.

In general, a blender is a household appliance that chops food contained in a container, crushes the food into powder, or makes the food into a state such as a liquid by a blade rotated by an electric motor and is also commonly referred to as a mixer.

In a typical blender, a container is seated on an upper surface of a main body in which a motor is built, and when the container is seated, a blade inside the container is connected to a rotation shaft of the motor to be rotatable. In addition, the user can drive the motor by operating the main body after putting food in the container, and the blade is rotated by the driving of the motor to crush the food.

33Such a blender has recently been developed as a large-capacity blender having a large container size, and a blender using a motor rotated at ultra-high speed to be capable of crushing various foods more effectively has been developed.

In addition, the blender may perform manipulation for crushing various foods, and a blender has been developed to crush various foods through simple manipulation.

In the International Patent Publication PCT/EP2016/074116, a control button that is manipulated to be rotated may be provided on the front surface of a base part on which the container is seated. The user manipulates the control button to operate the blender according to a preset cooking program, and a blender capable of inputting operation of the blender by simple manipulation of the user is disclosed. In addition, a display screen may be provided on the front surface of the base part, a cooking program selected through the control button may be displayed through the display screen, and a blender capable of easily inputting manipulation by a user is disclosed.

However, in this related art, there is a problem that the control button protruding from the front portion may be structurally pushed to the rear. In other words, the control button may be pressed during a malfunction of the protruding control button, and if the control button is pressed with a strong force, there is a problem that the control button or the internal structure of the base part may be damaged.

In particular, due to the structure of the control button for selecting the operation by rotation, the control button is inevitably supported by the PCB inside the base part, so if a strong force is applied to the control button, the PCB may be damaged.

In addition, if there is no a structure for securely supporting the control button disposed on the front surface from the rear, there is a problem that the control button may be displaced from the position for normal operation by the rear pushing of the control button.

In addition, if both the control button and the display screen are provided on the base part, there is a problem that an outer appearance of the front surface of the base part is not neat.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

An object of an embodiment of the present disclosure is to provide a blender that can securely support a knob assembly protruding outward of the main body.

An object of an embodiment of the present disclosure is to provide a blender that can prevent the pushing of the knob assembly during operation of the knob assembly.

An object of an embodiment of the present disclosure is to provide a blender that can intuitively transmit the operating state and information of the blender.

An object of an embodiment of the present disclosure is to provide a blender that can maintain the outer appearance of the main body more compact and neat.

A blender according to an embodiment of the present disclosure may include a main body including an outer case forming an outer appearance and an inner case configured to be received inside the outer case, a jar configured to be seated on the main body and provided with a blade device for crushing food, a motor assembly provided inside the inner case and configured to generate rotation power of the blade device, a main PCB device which is provided inside the inner case and on which a knob rotation shaft is mounted to input rotation of the knob rotation shaft, a knob assembly mounted on the knob rotation shaft and protruding outwardly through the outer case so that the operation of the knob assembly is manipulated by a user for operation manipulation of the motor assembly, and a supporter provided inside the inner case and supporting the main PCB device.

The supporter may include an upper supporter which is formed on the inner case and supports a rear surface of the main PCB device.

The upper supporter may protrude downward from an inner upper surface of the inner case to constrain an upper end of the main PCB device.

A plurality of upper supporters may be provided, and the plurality of upper supporters may be spaced apart along an upper end of the main PCB device.

The blender may further include a bottom plate configured to shield an opened lower surface of the inner case, in which the supporter may further include a lower supporter which is formed on the bottom plate and supports the main PCB device from the rear.

An upper end of the main PCB device may be supported by the upper supporter, and a lower end of the main PCB device may be supported by the lower supporter.

A plurality of lower supporters may be provided, and, the plurality of lower supporters may be spaced apart along an upper end of the main PCB device.

The lower supporter may include an inclined portion formed to have a slope at an upper end of the lower supporter to guide the main PCB device, and a vertical portion extending from a lower end of the inclined portion to a bottom surface of the bottom plate and supporting the main PCB device from the rear.

The main PCB device may include a main PCB on which a knob rotation shaft to which the knob assembly is rotatably coupled is mounted and a main bracket on which the main PCB is fixedly mounted and which is fixed to the inner case.

The main bracket may be formed along the circumference of the main PCB to receive the main PCB, and a plurality of bracket coupling portions fastened by a screw to a mounting portion formed in the inner case may be formed on the circumference of the main bracket.

A recessed mounting portion may be formed at a lower end of the inner case, and a bracket coupling portion protruding forward and seating on the mounting portion may be formed on a lower end of the main bracket.

The main PCB device may include a plurality of LEDs for emitting light toward the circumference of the knob assembly.

The knob assembly may include a knob body coupled with the knob rotation shaft, a knob ring penetrated by the knob body and mounted on the knob hole, and a light guide configured to guide the light emitted from the LED toward the outside, and in which the knob ring may be made of a material that can transmit the light of the LED.

The LED may include an inner LED disposed along the circumference of the knob body and emitting light toward a rear end of the knob body, and an outer LED provided on the outside of the inner LED along the knob ring and emitting light toward the knob ring.

The light guide may be formed with a coupling protrusion coupled to the main PCB device, and the light guide may be in close contact with the main PCB device to receive the LED.

The light guide may include an outer part formed along the knob ring at a position corresponding to the knob ring, and an inner part formed to have an outer diameter smaller than an inner diameter of the outer part from the inner side spaced from the outer guide, and in which a plurality of light holes penetrating the outer part at positions corresponding to each of the plurality of outer LEDs may be formed on the outer part, and a guide opening corresponding to the inner LED may be formed between the outer part and the inner part.

The light hole may be formed so that an inner diameter thereof becomes narrower toward the front from the rear end.

The outer LED may be received in an opened rear surface of the light hole, and an opened front surface of the light hole may be in contact with the knob ring.

Any one of a plurality of the outer LEDs may turn on when the plurality of the outer LEDs are manipulated by the rotation of the knob assembly.

A plurality of inner LEDs may be provided, and all the plurality of inner LEDs may be turned on in a specific state of the blender.

A blender according to an embodiment of the present disclosure may include a main body, a jar configured to be seated on the main body and provided with a blade device for crushing food, a motor assembly provided inside the main body and configured to generate rotation power of the blade device, a main PCB device which is provided inside the main body and on which a knob rotation shaft is mounted to input rotation of the knob rotation shaft, a knob assembly mounted on the knob rotation shaft and protruding outwardly through the main body so that the operation of the knob assembly is manipulated by a user for operation manipulation of the blender, and a supporter provided inside the main body and supporting the main PCB device.

A blender according to an embodiment of the present disclosure may include a main body, a jar configured to be seated on the main body and provided with a blade device for crushing food, a motor assembly provided inside the main body and configured to generate rotation power of the blade device, a main PCB device which is provided inside the main body and on which a knob rotation shaft is mounted to input rotation of the knob rotation shaft, and a knob assembly mounted on the knob rotation shaft and protruding outwardly through the main body so that the operation of the knob assembly is manipulated by a user for operation manipulation of the blender.

The knob assembly may include a knob body coupled with the knob rotation shaft, a knob deco coupled to the knob body and protruded outside the main body to form a portion manipulated by the user, a knob ring penetrated by the knob body and mounted on the main body and the knob ring made of a material that can transmit the light, and a light guide configured to guide the light emitted from LEDs mounted the main PCB device toward the knob ring.

The knob assembly may include a knob coupled with the knob rotation shaft configure to be rotationally manipulated by the user, a knob ring penetrated by the knob body and mounted on the main body and the knob ring made of a material that can transmit the light, and a light guide configured to guide the light emitted from LEDs mounted the main PCB device toward the knob ring.

The knob includes a knob body coupled with the knob rotation shaft, and a knob deco coupled to the knob body and protruded outside the main body to form a portion manipulated by the user.

The LEDs may dispose along the circumference of the knob rotation shaft and emitted through the light guide, wherein the LEDs are turned on according to the manipulation of the knob assembly.

The main body may include an outer case forming an outer appearance, and an inner case configured to be received inside the outer case.

The blender according to an embodiment of the present disclosure can expect the following effects.

In the main PCB device on which the knob assembly is mounted, the bracket coupling portion may be coupled to the mounting portion of the inner case. In particular, the circumference of the main bracket is securely fixed to the inner case so that the main PCB device is securely fixed, and thus the knob assembly can also be maintained in a mounted state.

In addition, the main PCB device is supported from the rear by the supporter, so that even if a large force is applied toward the rear by manipulation of the knob assembly or impact, the main PCB device can maintain the position thereof without being pushed backward.

In particular, the supporter is composed of an upper supporter for constraining the upper end of the main PCB device inside the inner case and a lower supporter for constraining the lower end of the main PCB device in the bottom plate so that the main PCB device can be supported more securely so as not to be pushed backward.

In addition, the main PCB device is provided with an outer LED that is selectively turned on when the knob assembly is manipulated and an inner LED that is turned on according to a state of the blender, and the outer LED and the inner LED are turned on along the circumference of the knob assembly and thus the present disclosure has the advantage of making it easier to identify the state of the blender.

In particular, in the outer LED, the outer LED corresponding to the selected manipulation during the rotation manipulation of the knob assembly is turned on, and it is possible to display the selected manipulation on the knob ring exposed through the knob hole to visualize the user's manipulation more effectively.

In addition, the manipulation of the knob assembly can be visualized by emitting light around the knob assembly adjacent to the knob assembly without having a separate display on the front surface of the blender, the selected manipulation can be displayed or the state of the blender can be displayed, and thus it can be possible to improve user convenience.

In addition, a separate configuration for the visualization is not required in the rest of the knob assembly except for the circumference thereof, both input and state of the manipulation through the knob assembly of the front surface of the blender main body and the knob ring disposed around the knob assembly can be visualized, and thus there is an advantage that the front outer appearance of the blender main body can be improved more concisely.

DETAILED DESCRIPTION OF THE EMBODIMENTS

Figure 1:
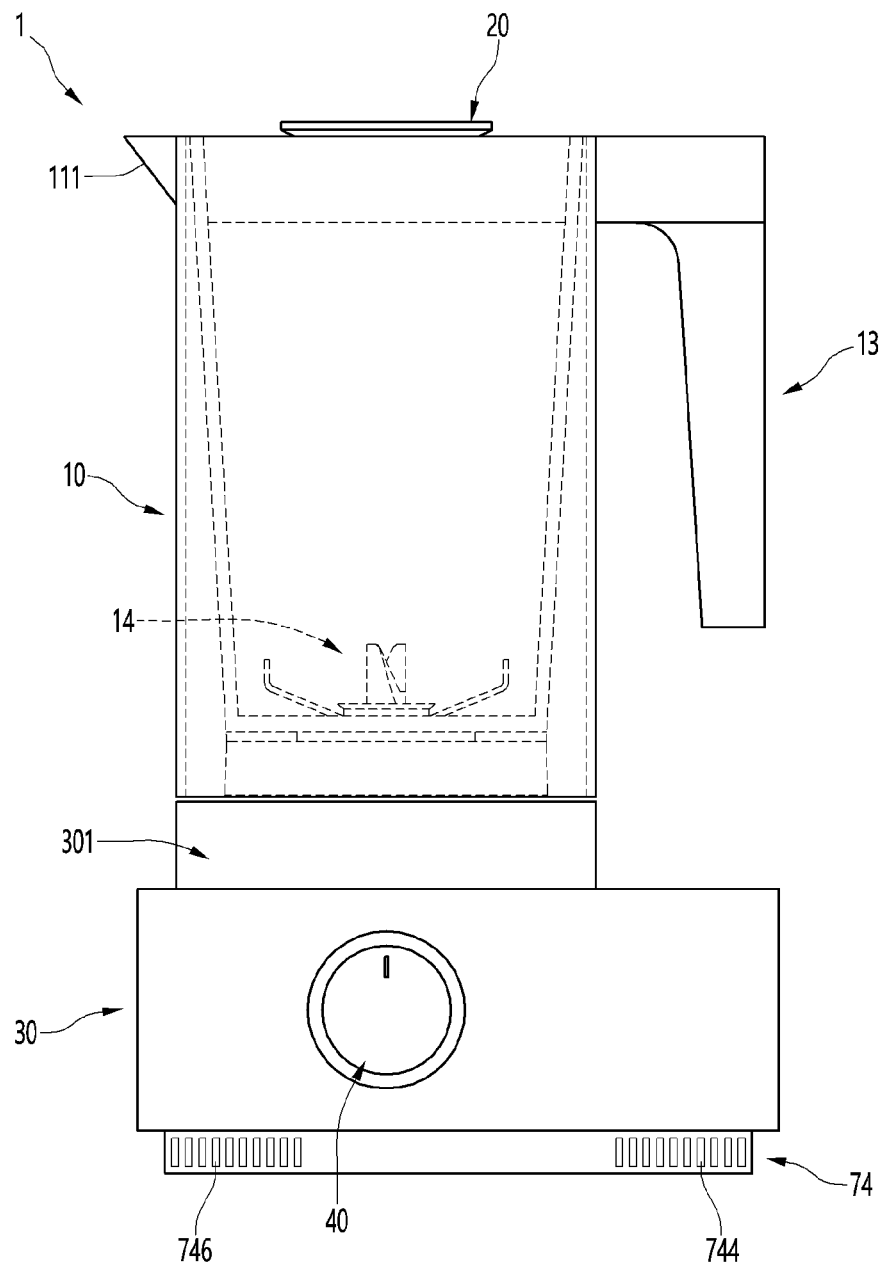
FIG. 1 is a front view illustrating a blender according to an embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 2:
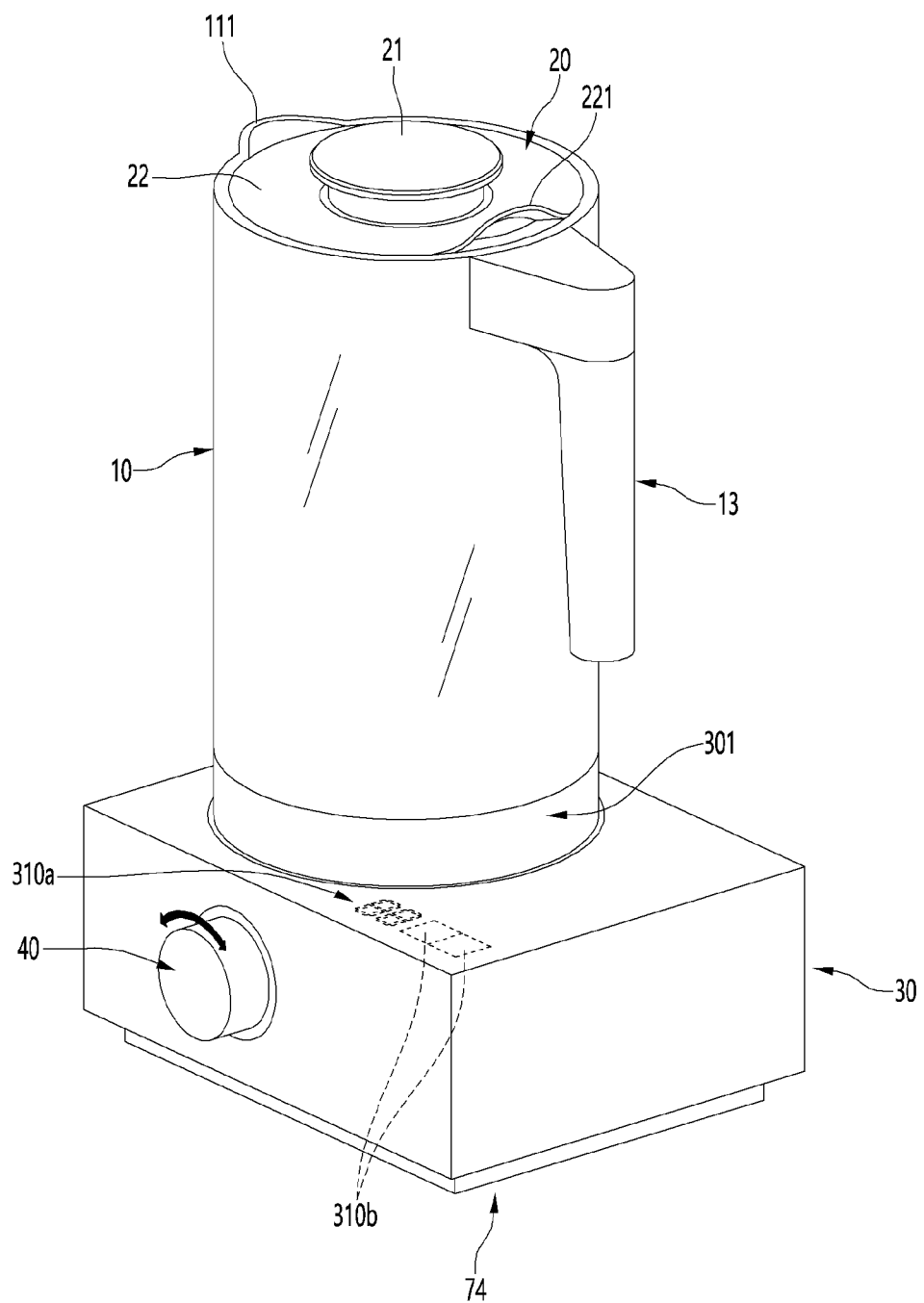
FIG. 2 is a perspective view illustrating the blender.
Figure 3:
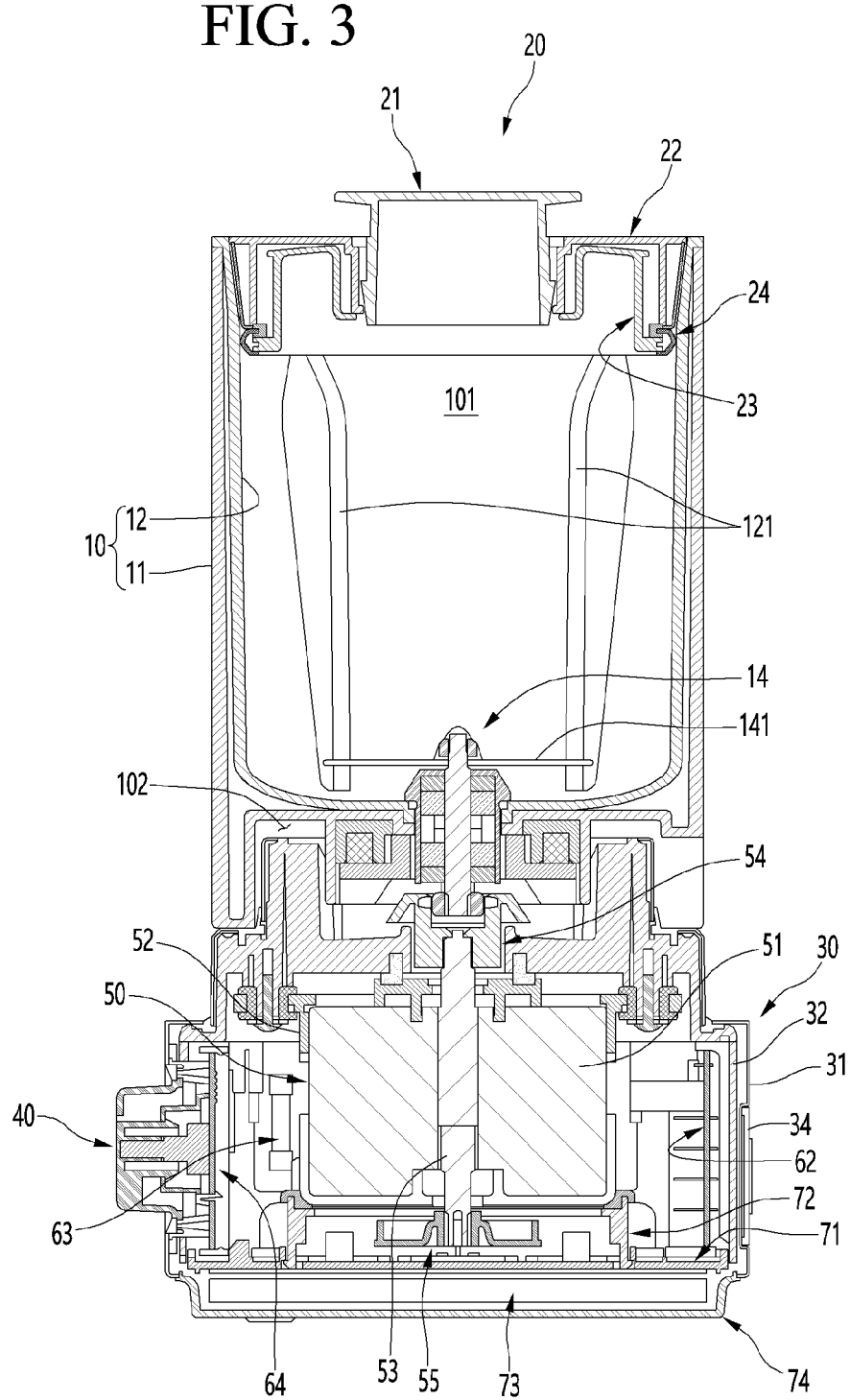
FIG. 3 is a longitudinal sectional view illustrating the blender.

Referring to FIG. 1 which is a front view illustrating a blender according to an embodiment of the present disclosure, FIG. 2 which is a perspective view illustrating the blender, FIG. 3 is a longitudinal sectional view illustrating the blender, FIG. 7 which is an exploded perspective view illustrating the main body as viewed from below, and FIG. 9 which is an exploded perspective view illustrating a disposition relationship of the inner case and the PCB devices, which are configurations of the main body.

For the convenience of explanation and understanding, the direction is first defined. A position or side or surface at which a knob assembly 40 is formed is generally defined as a front surface or a front side or front portion or front end, for example of the main body or the blender or of the inner case or the outer case or any other component of the blender. A position or side or surface opposite to the front side is generally defined as a rear side or rear surface or rear portion or rear end for example of the main body or the blender or of the inner case or the outer case or any other component of the blender, for example the portion to which a power connector (35 in FIGS. 6 and 15) is connected. Simply put, the rear side is opposite to the front side. A position or side or surface at the bottom of a main body 30 may be generally referred to as a lower surface or lower side or bottom side or lower portion or lower end, for example of the main body or the blender or of the inner case or the outer case or any other component of the blender. A position or side or surface opposite to the bottom side may be generally referred to as an upper surface or upper side or top side or upper portion or upper end, for example of the main body or of the inner case or the outer case or any other component of the blender, whereas a position or side or surface of the upper end of the jar 10 may be generally referred to as an upper surface or an upper side or upper portion or upper end of the blender. In addition, the positions or sides or surfaces extending between the front and the rear sides and between the bottom and the upper sides may be generally referred to as side surfaces or as a left side or a left-side surface or left end and a right side or a right-side surface or right end, for example of the main body or the blender or of the inner case or the outer case or any other component of the blender. The upper side of the main body or the inner case or the outer case may be generally understood as the side or surface at which the jar is received.

Any references to directions may be construed in accordance with the front, rear, upper, lower and sides described hereinabove. For example, 'forward' direction and like phrases may be understood as a direction extending toward and/or beyond the front surface or side i.e. towards a user positioned in front of the front side, 'backward or rearward' direction and like phrases may be understood as a direction extending toward and/or beyond the rear surface or side i.e. away from a user positioned in front of the front side, 'lateral' direction and like phrases may be understood as a direction extending between and/or beyond the left and right sides i.e. horizontally in left-right direction with respect to a user positioned in front of the front side, 'vertical' direction and like phrases may be understood as a direction extending between and/or beyond the bottom and top sides, 'upward' direction and like phrases may be understood as a direction extending toward and/or beyond the upper surface or side, and 'downward' direction and like phrases may be understood as a direction extending toward and/or beyond the lower surface or side.

As illustrated, the blender 1 according to an embodiment of the present disclosure may include the main body 30 disposed on a bottom surface, and a jar 10 seated on the upper portion of the main body 30.

Figure 9:
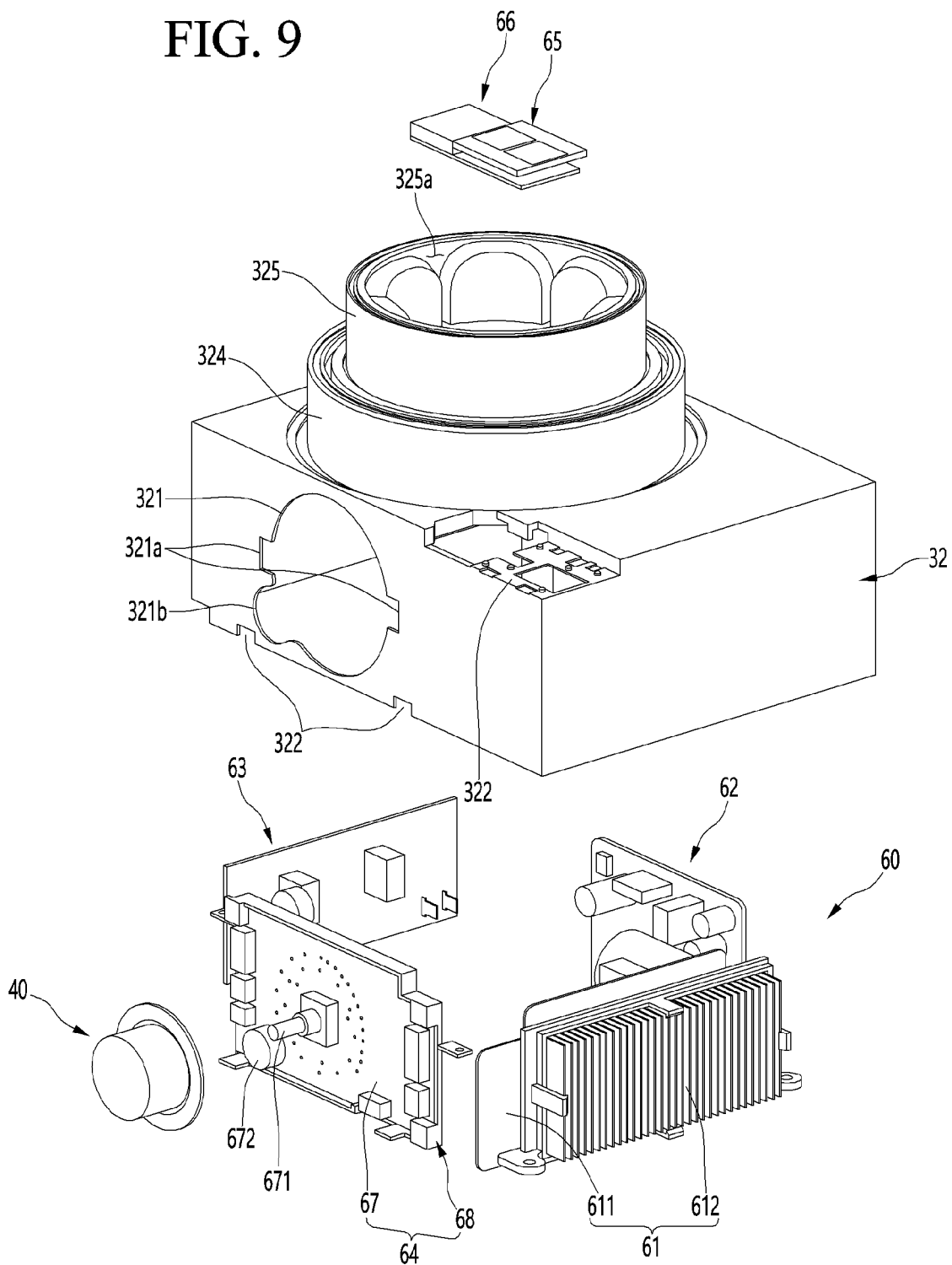
FIG. 9 is an exploded perspective view illustrating a disposition relationship of the inner case and the PCB devices, which are configurations of the main body.

The main body 30 may be provided with electrical devices and components, including a motor assembly 50 and a PCB device 60 (as also shown in FIG. 9) for the operation of the blender 1. In addition, manipulating portions 40 and 310b for manipulating the operation of the blender 1 and a display portion 310a for displaying operation thereof may be provided.

The main body 30 may be formed in a hexahedral shape as a whole, and a seating portion 301 for seating the jar 10 may be formed on an upper surface of the main body 30. The seating portion 301 may be configured to detach the jar 10 in the vertical direction.

The outer appearance of the main body 30 may be formed by an outer case 31 which may optionally be formed of a metal material or a metal texture, and the outer case 31 may be formed in a hexahedral shape with a bottom surface open. In addition, an inner case 32 may be formed inside the outer case 31, and space in which the motor assembly 50, the PCB device 60, and the like are mounted may be provided inside the inner case 32.

When the main body 30 includes the outer case 31 and the inner case 32, an outer surface or outer wall surface of the outer case 31 may be referred to as an outer surface of the main body 30, and an inner surface or inner wall surface of the inner case 32 may be referred to as an inner surface of the main body 30.

A knob assembly 40 for a user to set the manipulation of the blender 1 may be provided on the front surface of the main body 30. The knob assembly 40 protrudes from the front surface of the main body 30 and can operate and set the operation of the blender 1 by a rotation manipulation.

A bottom cover 74 may be provided on the lower surface of the main body 30. The bottom cover 74 may be coupled with the outer case 31 and the inner case 32 and may be formed to be in contact with the bottom surface on which the blender 1 is installed. In addition, the bottom cover 74 allows the outer case 31 and the inner case 32 to be spaced apart from the bottom surface, and a cover suction port 744 and a cover discharge port 746 through which cooling air is suctioned and discharged into and out of the main body 30 can be formed.

A display portion 310a for visualizing an operation state of the blender 1 may be provided on the upper surface of the main body 30. For example, the display portion 310a may have a shape such as at least one seven-segment display. In addition, a touch manipulating portion 310b capable of manipulating the start or stop of the blender 1 operation may be provided on an upper surface of the main body 30. For manipulation of the blender 1, the manipulating portions 40 and 310b may include at least one of the knob assembly 40 and the touch device 65.

In addition, a seating portion 301 may be formed on the upper surface of the main body 30. The seating portion 301 may protrude from the upper surface of the main body 30, and a part of the seating portion 301 may be inserted into the lower surface of the jar 10 to stably support the jar 10. When the jar 10 is seated on the seating portion 301, the motor assembly 50 and the blade device 14 inside the jar are coupled to each other to transmit the rotational force to the blade device 14.

The seating portion 301 may be located on one side slightly biased from the center of the main body 30. The entire horizontal length including a handle 13 of the jar 10 and the horizontal length of the main body 30 are formed to correspond to each other. Therefore, the center of the food receiving space of the jar 10 may be located to be eccentric from the center of the main body 30, and the center of the seating portion 301 is also on the same extension line as the center of the jar 10 i.e. of the food receiving space of the jar 10. In addition, the knob assembly 40 may be located at a position corresponding to the centerline of the seating portion 301 and the jar 10 and may be located on one side of the front surface of the main body 30, which is eccentric.

The outer appearance of the seating portion 301 may also be made of the same material as the outer case 31. The seating portion 301 may be made of a metal material or a material having a metal texture to have a sense of unity with the outer appearance of the main body.

A motor assembly 50 may be mounted inside the main body 30 under the seating portion 301. The motor assembly 50 is for rotation of the blade device 14 inside the jar 10 and the blade device can be rotated at a high speed. In addition, the motor assembly 50 can adjust the rotation speed according to the manipulation of the knob assembly 40.

The upper end of the motor assembly 50 may be connected to the blade device 14 inside the jar 10. In addition, a cooling fan 55 may be provided at a lower end of the motor assembly 50, and when the motor assembly 50 is driven, the cooling fan 55 can rotate simultaneously with the blade device 14 to force the flow of cooling air inside the main body 30. The motor assembly 50 may be configured to drive the blade device 14 and/or the cooling fan 55.

Meanwhile, a plurality of PCB devices 60 may be disposed on the inner wall surface of the inner case 32 forming the inner surface of the main body 30. A plurality of PCB devices 60 may be provided and may be disposed on the circumference of the inner surface of the main body 30, that is, on the front surface and the rear surface, and both left and right surfaces thereof, respectively.

In addition, the opened lower surface of the inner case 32 may be shielded by the base plate 71. In addition, an air guide 72 for guiding the discharge of cooling air suctioned by the cooling fan 55 may be provided on the base plate 71.

The predetermined space may be formed between the base plate 71 and the bottom cover 74, and a wireless power device 73 may be provided between the base plate 71 and the bottom cover 74. The wireless power device 73 is capable of supplying power to the motor assembly 50 in a wireless manner using induced electromotive force.

Meanwhile, the jar 10 may be formed in a cylindrical shape corresponding to the outer diameter of the seating portion 301, and the upper surface of the jar is opened to form a food receiving space 101 therein.

The jar 10 may be formed of a material such as glass, Tritan, transparent plastic, or the like to check the food state inside during the operation of the blender 1. In addition, the jar 10 may include an outer jar 11 forming an outer shape and an inner jar 12 forming an inner space in which food is received.

The inner jar 10 and the outer jar 11 are combined to form the overall shape of the jar 10, and the jar 10 may have a double-wall structure. In addition, the outer jar 11 may be formed in a cylindrical shape having the same outer diameters at the upper end and the lower end, so that the outer appearance of the jar 10 can be seen neatly. In addition, the outer diameter of the outer jar 11 is formed to be the same as the outer diameter of the seating portion 301 so that the main body 30 and the jar have a sense of unity in a state where the jar 10 is mounted on the main body.

In addition, a main body receiving portion 102 may be formed on the lower surface of the outer jar 11. The main body receiving portion 102 forms space recessed upward from the lower surface of the outer jar 11 and forms space into which a second seating portion 325 to be described below can be inserted. By the coupling of the main body receiving portion 102 and the second seating portion 325, the jar 10 may maintain a state of being attached to the seating portion 301.

The jar 10 may be provided with a blade device 14 at the center of the inner lower surface. The blade device 14 includes a plurality of blades 141 and may be connected to the motor assembly 50. Therefore, when the motor assembly 50 is driven in a state where the jar 10 is seated on the main body 30, the blade 141 may be rotated to crush or cut food inside the jar 10.

In addition, a plurality of inner guides 121 for guiding food to be rotated may be formed inside the jar 10. The inner guide 121 may extend upward from a lower end of the inner surface of the jar 10 to a predetermined length and may extend to a lower surface of the lid 20 when the lid 20 is mounted.

Meanwhile, a spout 111 that can pour the crushed food may protrude on the upper end of the jar 10, and a handle 13 may protrude on one side facing the spout 111. The handle 13 protrudes outward from the upper end of the jar 10 and then extends downward to allow the user to lift or move the jar 10. The protruding end portion of the handle 13 may be located on the same extension line as the side end of the main body 30.

In addition, the lid 20 may be mounted on the opened upper surface of the jar 10. The lid 20 may shield the opened upper surface of the jar 10, and the user holds the lid handle 13 and separates the lid 20 from the jar 10 to open and close the opened upper surface of the jar 10. The lid 20 may include a lid upper portion 22, a lid lower portion 23, and the lid handle 221, and a lid gasket 24 may be provided along the circumference of the lid 20.

Figure 4:
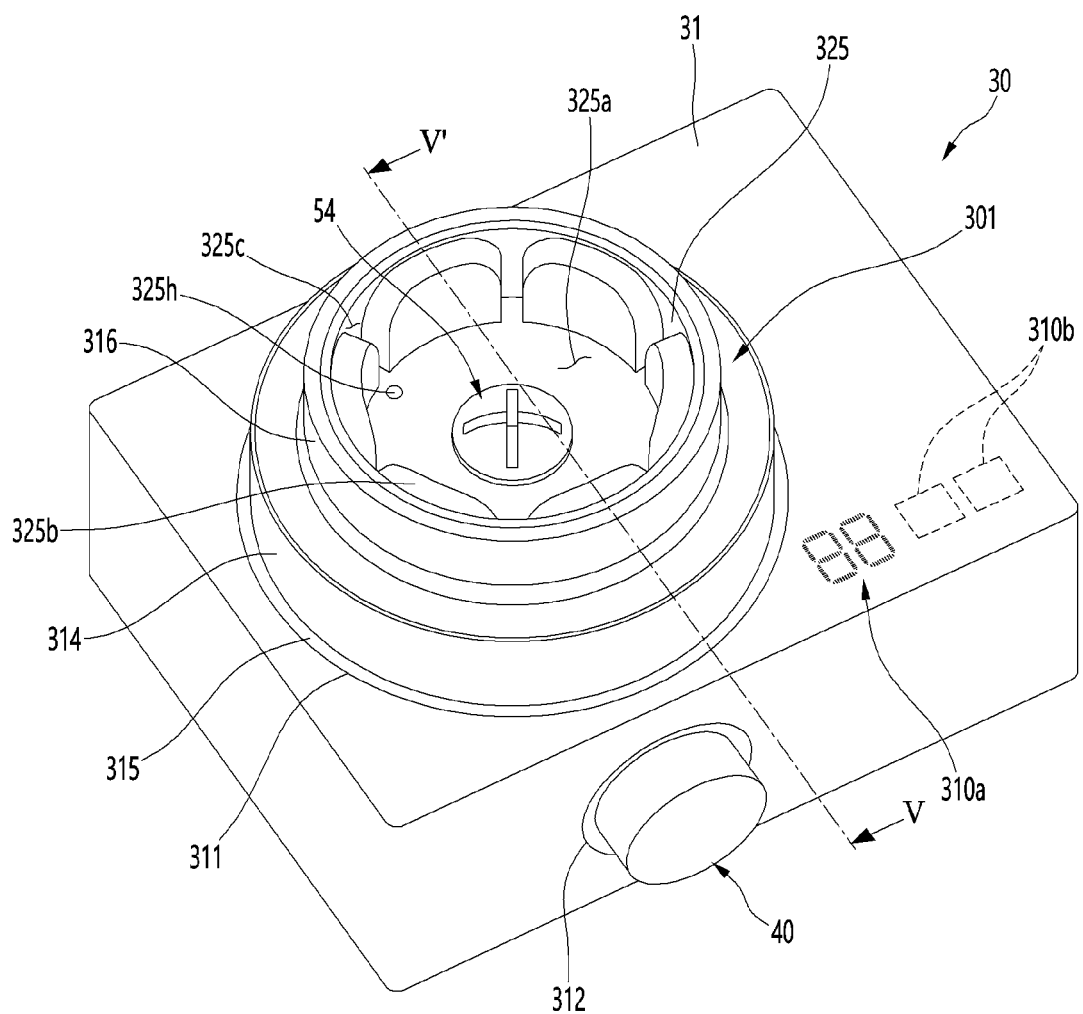
FIG. 4 is a perspective view illustrating a main body that is one component of the blender.
Figure 5:
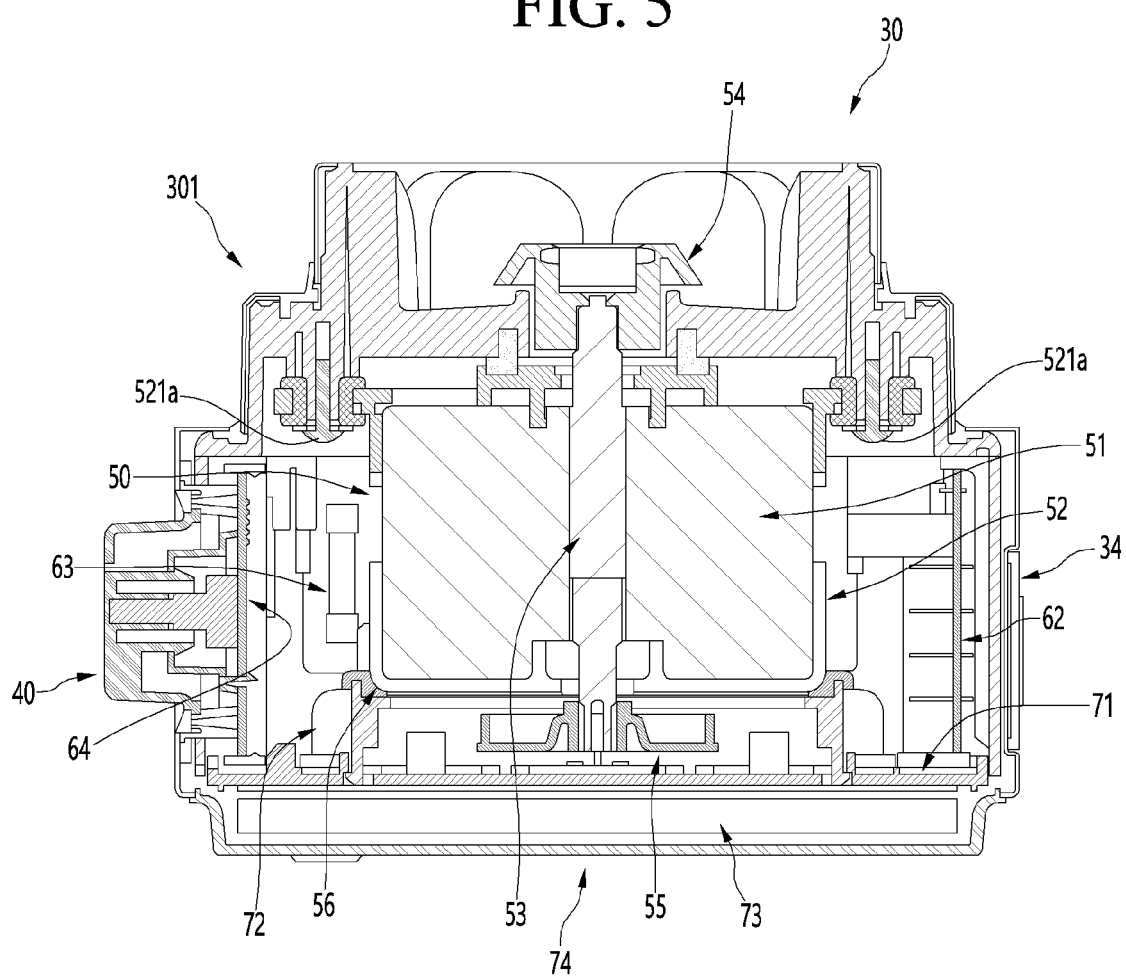
FIG. 5 is a cross-sectional view taken along line 5-5' in FIG. 4.
Figure 6:
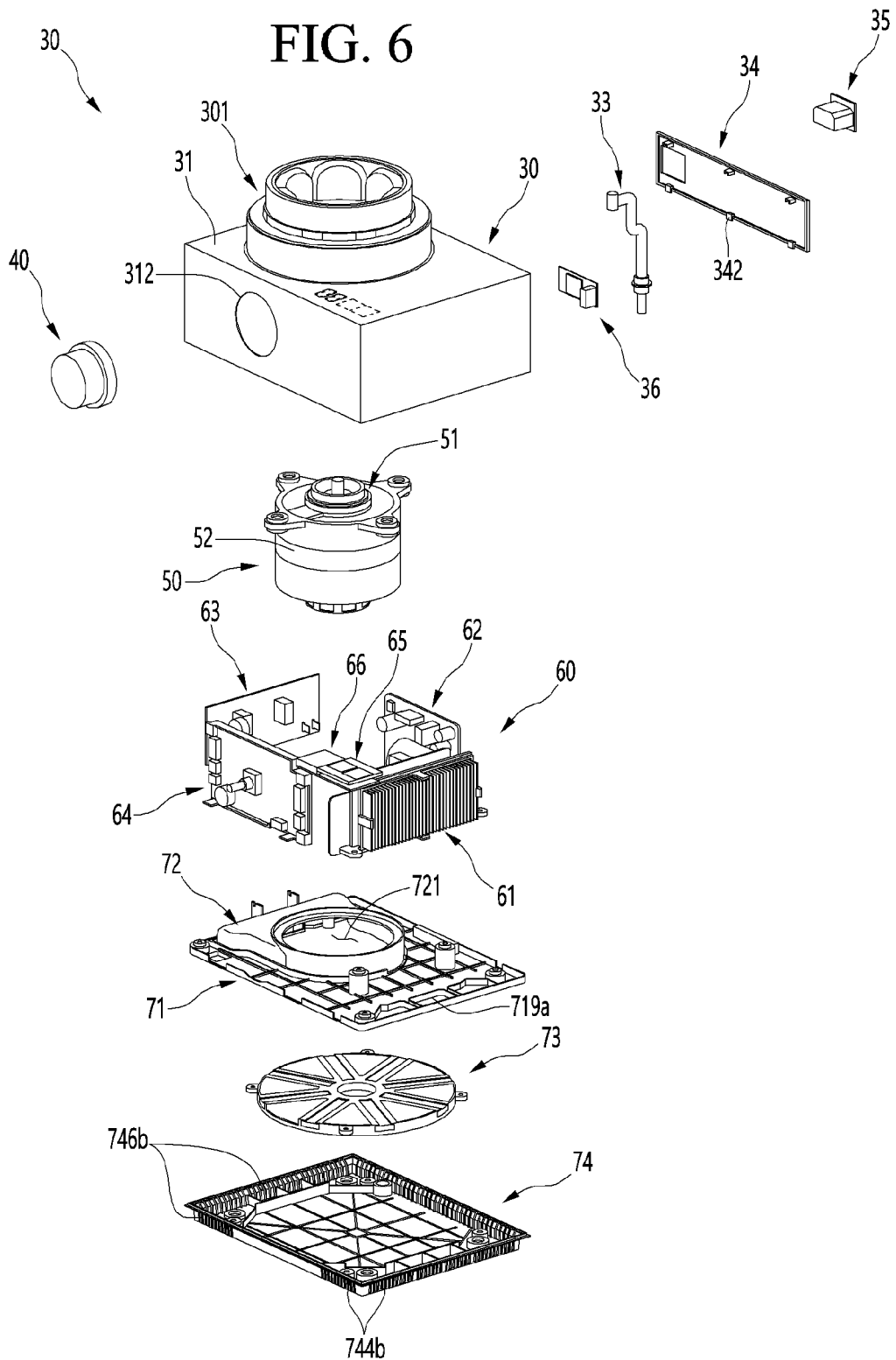
FIG. 6 is an exploded perspective view illustrating the main body as viewed from above.
Figure 7:
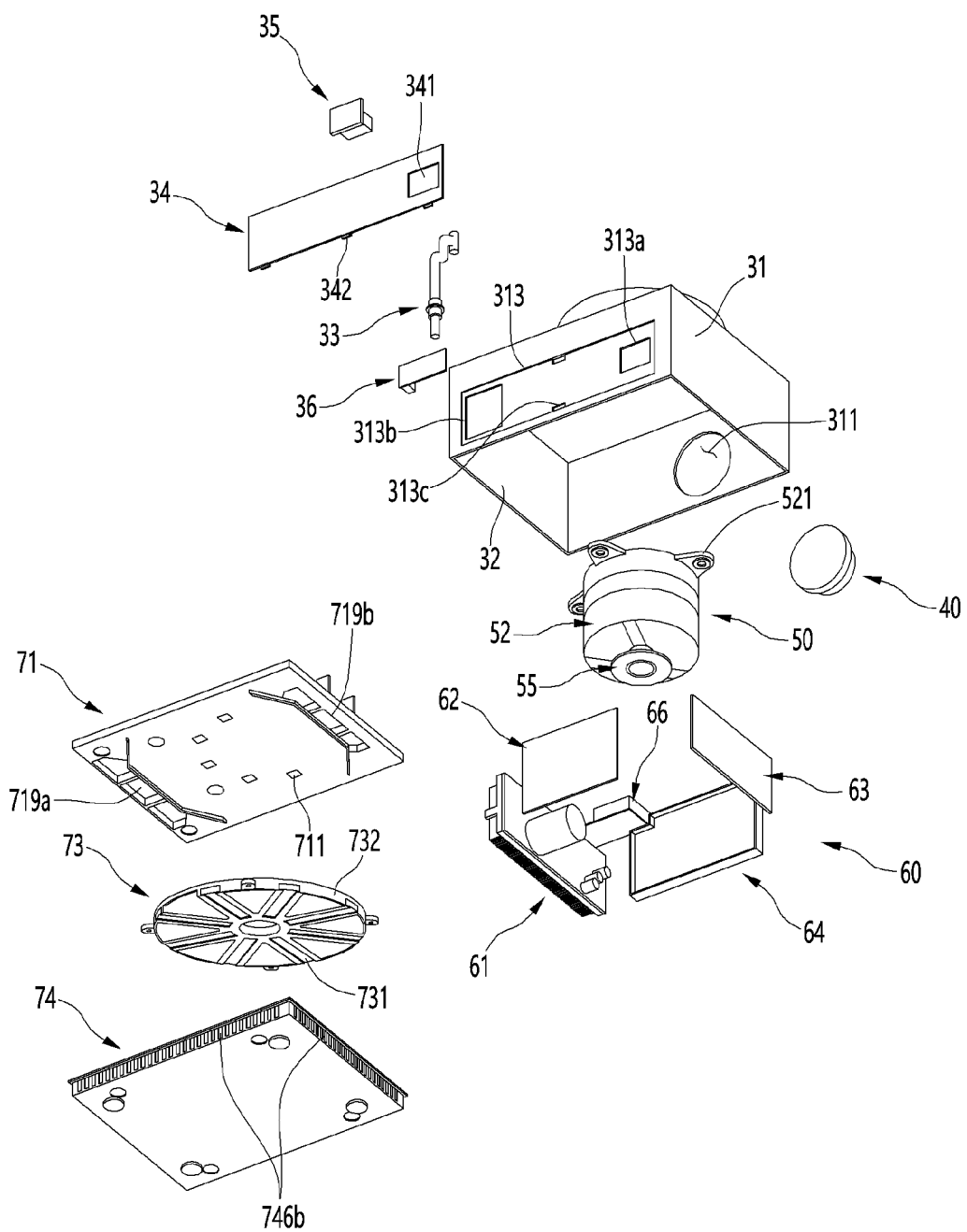
FIG. 7 is an exploded perspective view illustrating the main body as viewed from below.
Figure 8:
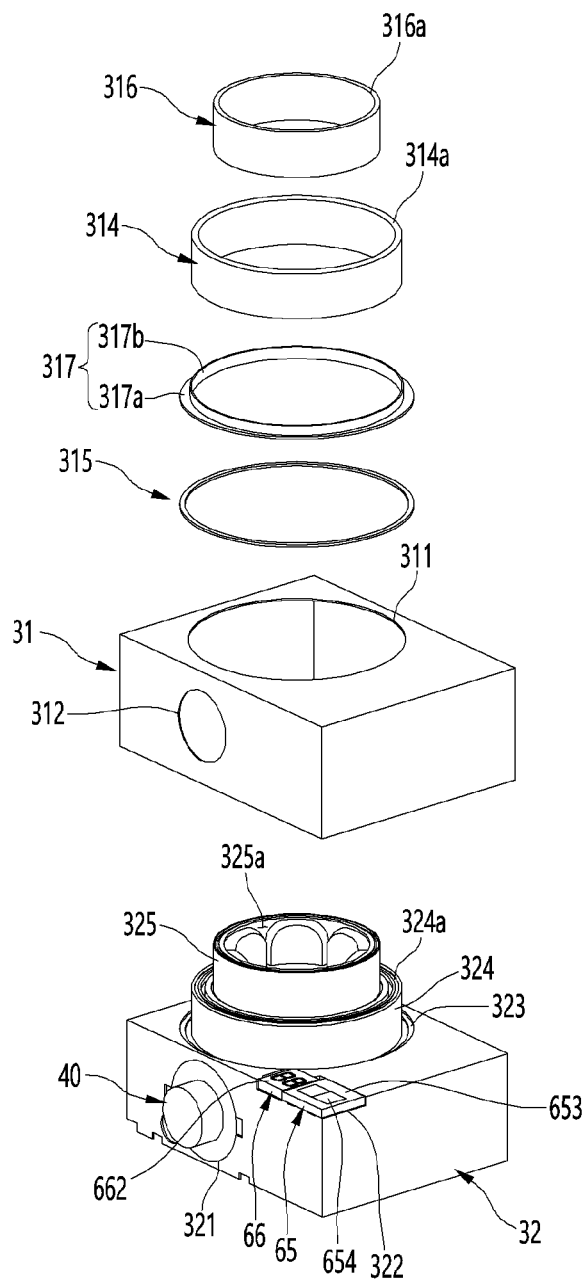
FIG. 8 is an exploded perspective view illustrating components constituting the outer appearance of the main body.

FIG. 4 is a perspective view illustrating a main body that is one component of the blender, FIG. 5 is a cross-sectional view taken along line 5-5' in FIG. 4, FIG. 6 is an exploded perspective view illustrating the main body as viewed from above, FIG. 7 is an exploded perspective view illustrating the main body as viewed from below, FIG. 8 is an exploded perspective view illustrating components constituting the outer appearance of the main body, and FIG. 9 is an exploded perspective view illustrating a disposition relationship of the inner case and the PCB devices, which are configurations of the main body.

As illustrated in the drawings, the main body 30 is formed in a box shape of a rectangular parallelepiped, a seating portion 301 for seating the jar 10 protrudes on the upper surface of the main body 30, and the main body 30 may have a structure in which a knob assembly 40 for manipulating the operation of the blender 1 is disposed on the front surface thereof.

In addition, the internal and overall structure of the main body 30 is formed by the inner case 32, and the outer case 31 is mounted outside the inner case 32 to form the outer appearance of the main body 30. To this end, the inner case 32 may be formed of a plastic material to provide a structure in which internal and external components of the main body 30 can be mounted, for example by injection molding. In addition, the outer case 31 may be made of a metal material such as stainless steel, and a plate-shaped material may be bent and bonded to provide a very clean and robust outer appearance. Therefore, the outer case 31 can form the outer appearance of the main body 30 in the shape of a hexahedron with a lower surface open, and the inner case 32 provides a structure in which a plurality of configurations can be mounted inside the outer case 31.

The outer case 31 and the inner case 32 have a shape in which a lower surface is opened, and a motor assembly 50 and a plurality of the PCB devices 60 may be disposed therein. In addition, the opened lower surface of the inner case 32 is shielded by the base plate 71, and the lower surface of the main body 30 may be formed by the bottom cover 74.

Looking at the structure of the main body 30 in more detail, the outer case 31 may include a quadrangular upper surface, a front surface, a rear surface, and both left and right surfaces, which extend downward along the circumference of the upper surface.

An upper surface opening 311 may be formed on the upper surface of the outer case 31. The upper surface opening 311 may be formed to have a diameter equal to or slightly larger than the outer diameter of the seating portion 301. Therefore, when the inner case 32 and the outer case 31 are coupled, an upper portion of the inner case 32 forming the seating portion 301 penetrates the upper surface opening 311 to be exposed to the outside of the outer case 31.

Meanwhile, a first seating portion deco 314, a second seating portion deco 316, a lower deco 315, and a connecting deco 317 are mounted on an upper portion of the inner case 32 protruding outward of the outer case 31. The seating portion 301 may have an overall outer appearance by the first seating portion deco 314, the second seating portion deco 316, the lower deco 315, and the connecting deco 317. The first seating portion deco 314 and the second seating portion deco 316 may be made of the same material as the outer case 31 or a material having the same texture as the outer case 31.

The first seating portion deco 314 and the second seating portion deco 316 may be formed in a ring shape having a predetermined height. The first seating portion deco 314 has a larger diameter than the second seating portion deco 316, and the connecting deco 317 may be formed in a ring shape connecting an upper end of the first seating portion deco 314 with the second seating portion deco 316.

In addition, the first seating portion deco 314, the second seating portion deco 316, and the connecting deco 317 may be mounted on outer surfaces of a first seating portion 324 and a second seating portion 325 formed in the inner case 32 and the upper surface of the first seating portion 324.

The second seating portion 325 extends upward from the upper surface of the first seating portion 324, and insertion space 325a in which a jar coupling portion (not illustrated) formed in the blade device mounting portion 103 can be received may be formed therein. A jar coupling protrusion 325b and a jar coupling groove 325c coupled with a jar coupling portion protruding from the lower surface of the jar 10 may be formed on the inner surface of the insertion space 325a. In addition, a plurality of the jar coupling protrusions 325b and a plurality of the jar coupling grooves 325c may be continuously disposed along the inner surface of the second seating portion 325. Therefore, when the jar 10 is mounted on the seating portion 301, the jar coupling portion can be fixedly mounted in place by matching with the jar coupling protrusion 325b and the jar coupling groove 325c.

In addition, a knob hole 312 in which the knob assembly 40 is located may be formed on the front surface of the outer case 31. The knob assembly 40 may penetrate the knob hole 312 and protrude toward the front of the main body 30.

In addition, a plate groove 313 recessed to receive a rear plate 34 may be formed in the rear surface of the outer case 31. In addition, a rear opening 313b for more effective transmission of a communication signal from the communication device 36 may be formed in the plate groove 313. In addition, a plate mounting hole 313c in which the rear plate 34 is mounted may be further formed in the plate groove 313. A communication device 36 may be mounted inside the inner case 32 corresponding to the rear opening 313b. The rear plate 34 may be made of plastic material rather than metal, and thus, it may be easier to pass radio waves transmitted and received in the communication device 36. In addition, a connector hole 313a in which a power connector 35 for supplying power to the main body 30 is mounted may be formed in the plate groove 313.

The rear plate 34 is formed in a plate shape having a size corresponding to the plate groove 313 and may be mounted to shield the inside of the plate groove 313. A plate opening 341 may be formed at a position of the rear plate 34 corresponding to the connector hole 313a, and the power connector 35 may be mounted in the plate opening 341. In other words, the power connector 35 may be mounted in the plate groove 313 while being fixed to the plate opening 341 and inserted into the main body 30 through the connector hole 313a. In addition, a plate mounting protrusion 342 coupled with a plurality of the plate mounting holes 313c may be formed around the rear plate 34. Therefore, the rear plate 34 may be mounted in the plate groove 313 from the outside of the outer case 31.

Meanwhile, the inner case 32 may be formed in a box shape with a lower surface open, and a seating portion 301 may be formed on the upper surface of the inner case 32. The inner case 32 may be composed of a planar upper surface as a whole, a front surface, a rear surface, and both left and right surfaces, which extend vertically downward along the circumference of the upper surface. The inner case 32 may be made of a plastic material to be shaped into a relatively complex shape and may provide a structure for mounting the motor assembly 50 and the PCB device 60 therein.

A knob mounting hole 321 may be formed on the front surface of the inner case 32. The knob mounting hole 321 may be opened so that the knob assembly 40 may be disposed in a state of being mounted on the main PCB device 64, and may be located behind the knob hole 312. The knob mounting hole 321 may be formed larger than the knob hole 312, so that the knob assembly 40 may be received in the knob hole. In addition, a portion of the knob assembly 40 may be exposed to the outside through the knob hole 312.

Meanwhile, a buzzer groove 321b to which a buzzer 672 mounted on a main PCB 67 is exposed may be formed on one side of the circumference of the knob mounting hole 321. The buzzer groove 321b is recessed outward and may be formed to have a size corresponding to the buzzer 672 at a position corresponding to the buzzer 672. Therefore, the sound output from the buzzer 672 may be better transmitted to the outside.

In addition, guide grooves 321a in which ring guides 434 protruding from both sides of the knob assembly 40 are received may be formed on both sides of the circumference of the knob mounting hole 321. The guide groove 321a is recessed outside of the knob mounting hole 321 and may be formed on both sides facing each other. Accordingly, interference between the knob assembly 40 and the inner case 32 may be prevented by the guide groove 321a while the knob assembly 40 is mounted. In addition, the knob assembly 40 may have directionality when mounted by the buzzer groove 321b and the guide groove 321a, and the knob assembly 40 may be mounted at an accurate position.

An upper surface mounting portion 322 may be formed on the upper surface of the inner case 32. The upper surface mounting portion 322 may be recessed such that the display device 66 and the touch device 65 are mounted. The upper surface mounting portion 322 is formed to be stepped, and the display device 66 and the touch device 65 may be shielded by the outer case 31 in a state of being mounted on the upper surface mounting portion 322.

In addition, a display portion 310a formed in a 7-segment shape by a plurality of minute holes may be formed on the outer case 31 corresponding to the display device 66, and light emitted from the display device 66 is transmitted to be capable of displaying the operation information of the blender 1 in numbers or letters.

In addition, a touch manipulating portion 310b may be formed on the upper surface of the outer case 31 corresponding to the touch device 65 by printing or surface processing. Therefore, the user can input manipulation for the operation of the blender 1 to the touch device 65 by touching the touch manipulating portion 310b. A plurality of touch manipulating portions 310b may be provided. For example, one touch manipulating portion 310b may allow the start or stop and end of the operation of the motor assembly 50 to be input, while the other touch manipulating portion 310b is pressed, the motor assembly 50 can be operated, and if the other touch manipulating portion 319 is not pressed, the motor assembly 50 can be stopped.

Meanwhile, a motor assembly 50 may be provided in the inner space of the inner case 32. The motor assembly 50 is for rotation of the blade device 14 and may be located at the lower side corresponding to the center portion of the seating portion 301.

The motor assembly 50 may include a motor 51 including a motor shaft 53 extending in the vertical direction, a motor housing 52 in which the motor 51 is received, a motor-side connecting portion 54 provided on an upper end of the motor shaft 53, and a cooling fan 55 provided at the lower end of the motor shaft 53.

At the upper end of the motor shaft 53, the motor-side connecting portion 54 that is coupled to the blade device 14 when the jar 10 is mounted, may be provided. The motor-side connecting portion 54 may be coupled to the blade device 14 to transmit the rotational force of the motor 51. The motor-side connecting portion 54 may be exposed through the upper surface of the inner case 32 and may be located at the center of the insertion space 325a inside the seating portion 301.

The cooling fan 55 is exposed to the outside of the motor housing 52 and may be received inside an air guide 72 to be described below. Therefore, when the cooling fan 55 is operated, air passing through the motor housing 52 may be guided inside the air guide 72.

In addition, airflow may be generated inside the main body 30 according to the driving of the cooling fan 55, and in particular, at least some of the PCB devices 60 disposed outside the motor housing 52 is located on the airflow path generated by the driving of the cooling fan 55 to be capable of being cooled together.

A plurality of PCB devices 60 for the operation of the blender 1 may be provided inside the inner case 32. The PCB devices 60 may be disposed on the inner surface of the inner case 32, respectively. A plurality of The PCB device 60 separated by functions may be provided and may be disposed in parallel to the wall surface of the inner case 32 at a position adjacent to the inner surface of the inner case 32.

In other words, the PCB device 60 may be disposed to surround the motor assembly 50 from the outside with respect to the motor assembly 50. Accordingly, when the motor assembly 50 is rotated, the PCB devices 60 may be located on a flow path of air passing through the motor assembly 50, and the PCB devices 60 may be cooled by air. In addition, more effective heat dissipation or cooling may be possible by allowing the cooling airflow to be concentrated to a PCB particularly having a high heating temperature among the PCB devices 60.

In detail, the PCB devices 60 may include a main PCB device 64, an inverter PCB device 61 for controlling the motor 51, a power PCB device 62 for controlling input power, and a filtering PCB device 63 for removing noise. Of course, the PCB devices 60 may be further provided with an additional PCB device 60 according to the function of the blender 1, or some of the PCB devices 60 may be omitted.

The main PCB device 64 is for controlling the overall operation of the blender 1, in particular, the knob assembly 40 is mounted to receive an input provided by the manipulation of the knob assembly 40. The main PCB device 64 may be mounted on the surface of the inner case 32, for example on the inner front surface of the inner case 32 i.e. inner surface of the inner case at the front side of the inner case, corresponding to the position where the knob assembly 40 is mounted. The main PCB device 64 may be connected to the display device 66 and the touch device 65. Accordingly, the main PCB device 64 may transmit operation information of the blender 1 to the display device 66 and receive a manipulation signal of the touch device 65 when the touch device 65 is manipulated.

The power PCB device 62 is for supplying power input to the inside of the blender 1 and may be mounted on an inner surface of the inner case opposite to the main PCB device 64, for example at an inner rear surface inside the inner case 32 in which the power connector 35 is disposed, i.e. inner surface of the inner case at the rear side of the inner case. The power PCB device 62 may be generally called SMPS (switching mode power supply). The power PCB device 62 converts and supplies power input from the power connector 35 to a stable power state for driving the blender 1. In addition, the power PCB device 62 may receive power from the wireless power device 73 when the blender 1 is used wirelessly, and likewise, the power PCB device converts and supplies the power into a stable power state for driving the blender 1.

The inverter PCB device 61 is for controlling the speed of the motor 51 and is configured to control the rotational speed of the motor 51 to be variable according to a user's manipulation. Due to the operating characteristics, the inverter PCB device 61 may generate heat at a high temperature during operation, and thus, intensive cooling may be required. To this end, the inverter PCB device 61 may be provided with a heat dissipation member 612 on the inner surface of the inner case 32 extending between the front side and rear side of the inner case for example at a side of the inner case corresponding to the plate suction port 719a to allow intensive cooling. The inverter PCB device 61 will be described in more detail below.

The filtering PCB device 63 may be connected to the power PCB device 62 and configured to remove noise on a power frequency outputted from the power PCB device 62. In addition, the filtering PCB device 63 may be provided on one side of the inner surface of the inner case 32 for example at the side facing the inverter PCB 611.

As such, the main PCB device 64, the power PCB device 62, the inverter PC device 61, and the filtering PCB device 63 may be respectively disposed at positions facing each other. In other words, the PCB devices 60 may be disposed in a form that surrounds the motor assembly 50 at four surfaces of the front, rear, left, and right sides in a state where the motor assembly 50 is placed at the center.

Meanwhile, a base plate 71 may be provided at a lower end of the inner case 32. The base plate 71 shields the opened lower surface of the inner case 32 and may support some of the components inside the inner case 32.

The base plate 71 may be formed in a plate shape and may be formed in a shape corresponding to the opened lower surface of the inner case 32. In addition, the circumference of the base plate 71 may be coupled with the lower end of the inner case 32, and the space between the circumference of the base plate 71 and the lower end of the inner case 32 may be airtight.

In addition, the plate suction port 719a and the plate discharge port 719b may be formed on both left and right sides of the base plate 71, respectively. The plate suction port 719a is formed along one side end of the base plate 71 and forms a passage through which air for cooling flows into the inner case 32 when the motor assembly 50 is driven. In addition, the plate discharge port 719b is formed along the other one side end of the base plate 71 and forms a passage through which cooling air inside the inner case 32 is discharged to the outside of the inner case 32.

An air guide 72 may be formed on the upper surface of the base plate 71. The air guide 72 is provided below the motor assembly 50 and connects the plate discharge port 719b at the housing lower hole 523 to guide the discharge of air cooling the motor while passing through the motor assembly 50. In other words, the air guide 72 forms independent airflow space from the motor assembly 50 to the discharge port.

The air guide 72 supports the lower end of the motor housing 52 and is formed so that the cooling fan 55 can be received therein. Therefore, when the cooling fan 55 is rotated, air passing through the motor housing 52 may flow along the air guide 72.

A wireless power device 73 may be provided on the lower surface of the base plate 71. The wireless power device 73 is for wireless power supply to the blender 1 and may be configured to include a plurality of ferrite cores and coils to receive power in an induced electromotive force method.

A bottom cover 74 may be provided below the base plate 71. The bottom cover 74 forms a lower surface of the main body 30 and is formed to shield the opened lower surface of the outer case 31. In addition, when the wireless power device 73 is mounted on the base plate 71, the wireless power device 73 may be shielded by the bottom cover 74.

The bottom cover 74 may be formed in a plate shape having a size corresponding to the opened lower surface of the outer case 31, and the circumference of the bottom cover 74 extends upward to be capable of coupling with the lower end of the outer case 31. In addition, a cover suction port 744 and a cover discharge port 746 may be formed on the bottom cover 74, and the inflow of external air and the discharge of air radiated from the inside of the main body 30 may be made through the cover suction port 744 and the cover discharge port 746.

Hereinafter, the main PCB device 64 provided in the inner case 32 and the knob assembly 40 mounted to the main PCB device 64 will be described in more detail with reference to the drawings.

Figure 10:
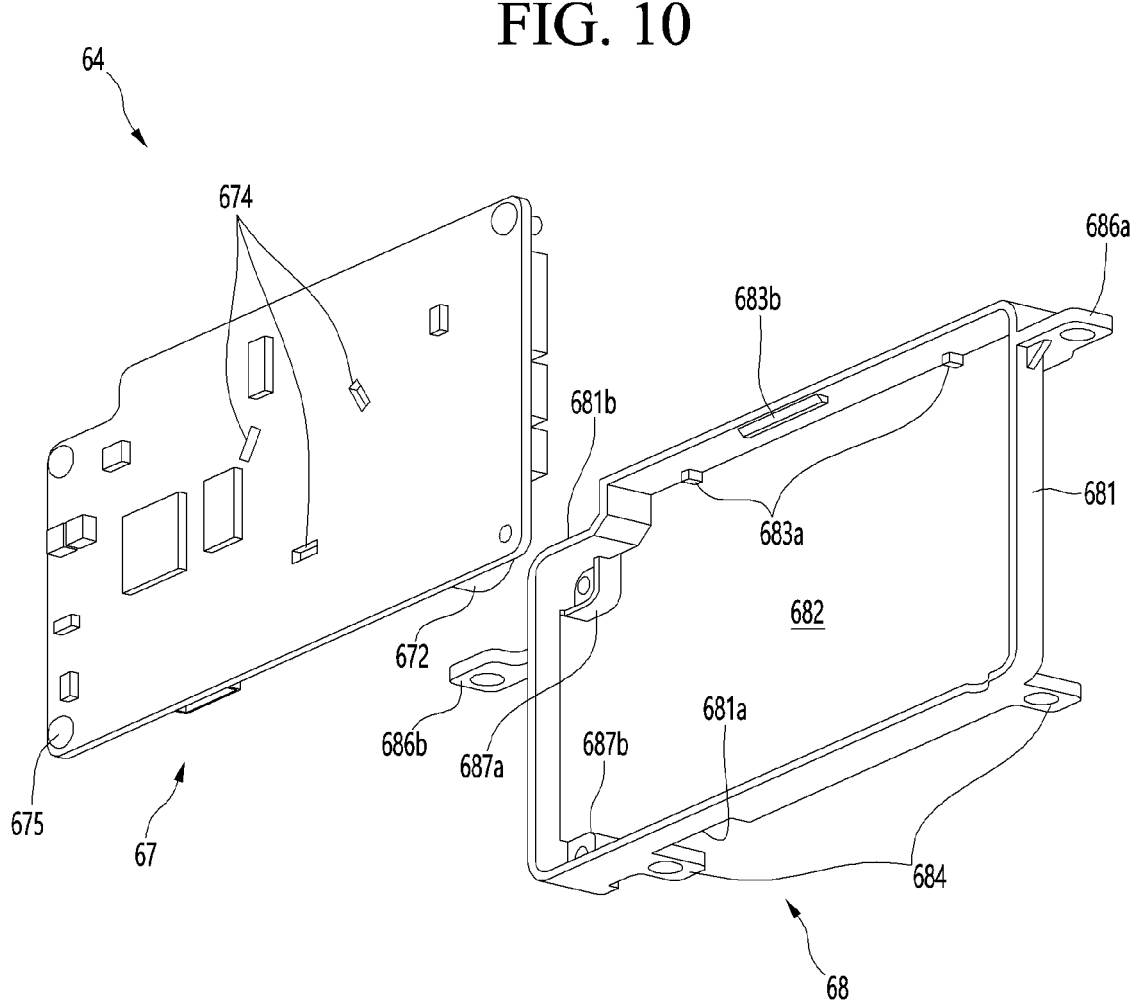
FIG. 10 is an exploded perspective view illustrating the main PCB device, which is one configuration of the blender.
Figure 11:
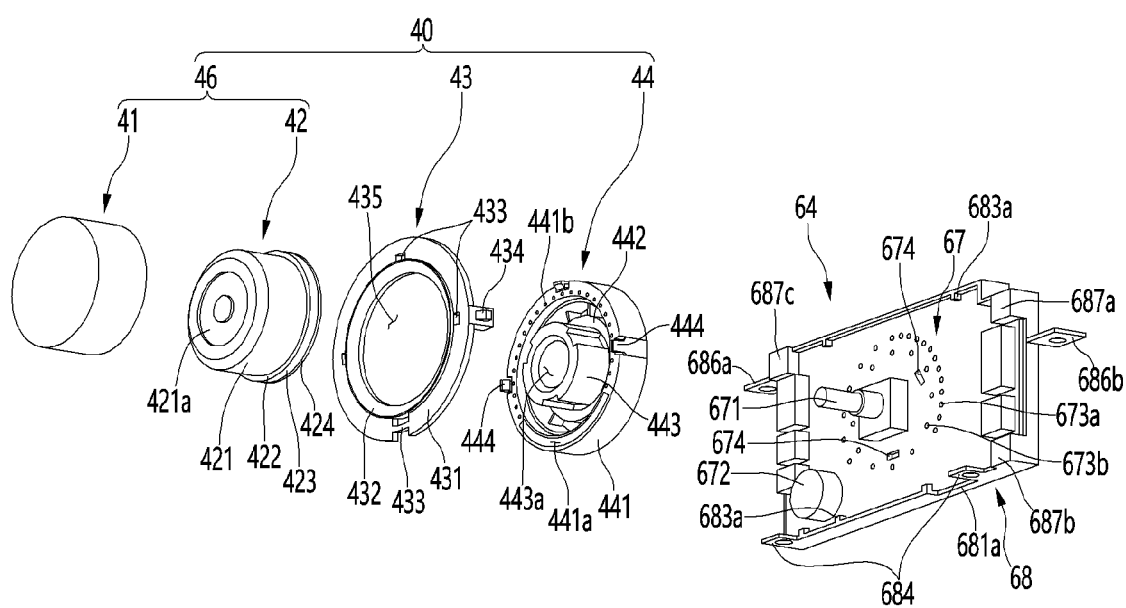
FIG. 11 is an exploded perspective view illustrating a knob assembly, which is one configuration of the blender, viewed from one direction.
Figure 12:
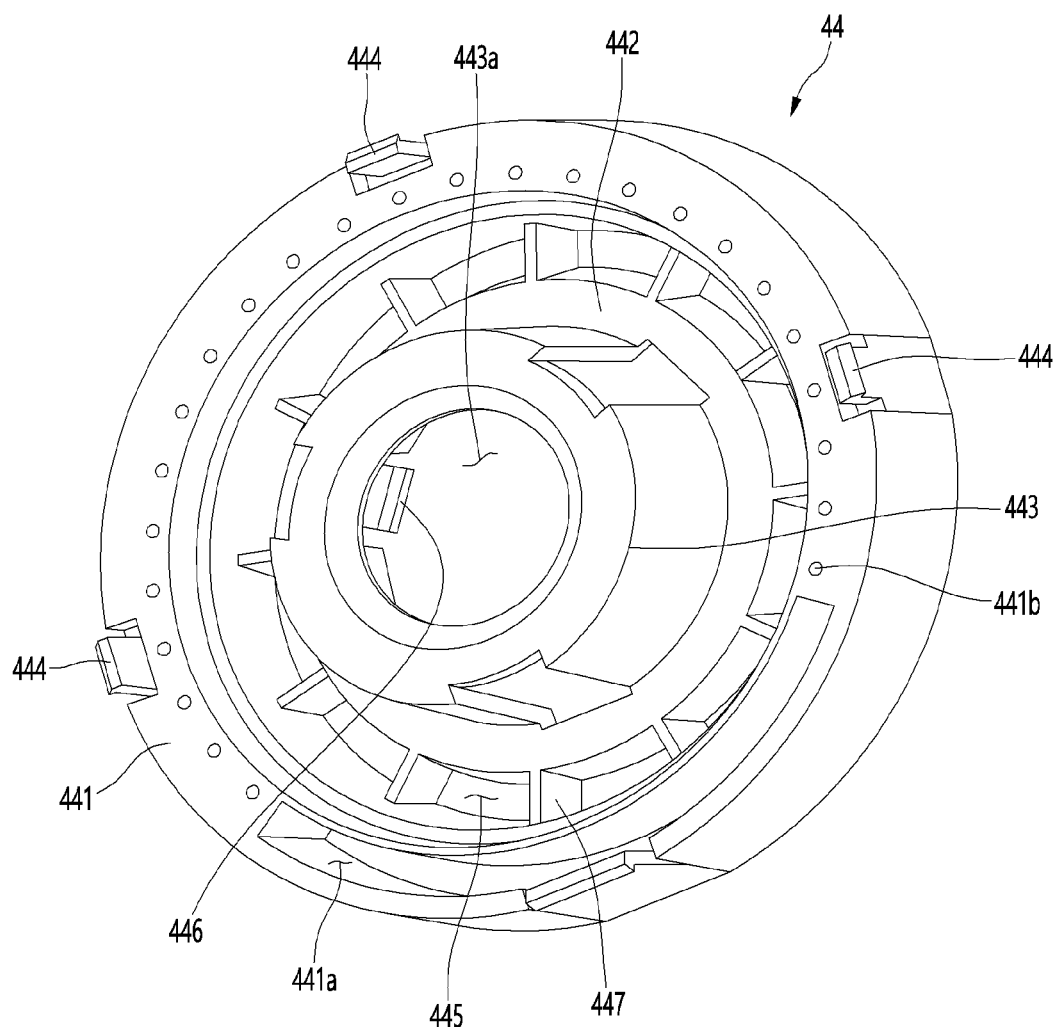
FIG. 12 is a perspective view illustrating a light guide which is one configuration of the knob assembly.
Figure 13:
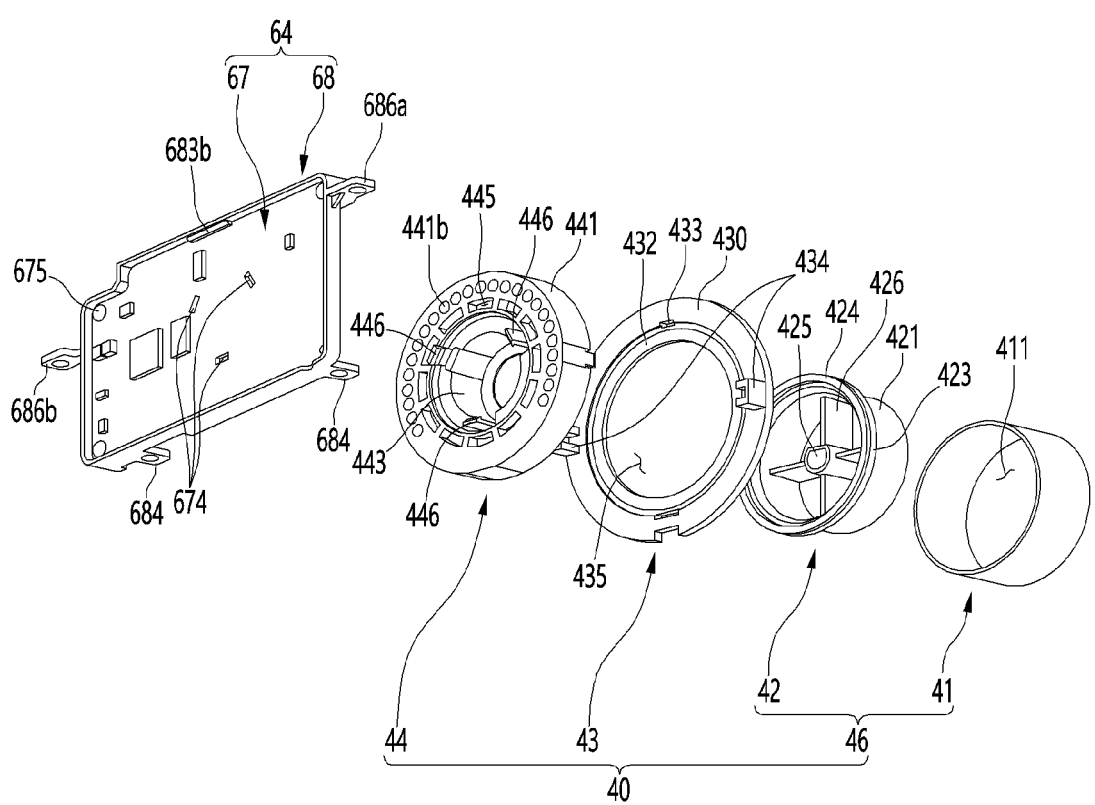
FIG. 13 is an exploded perspective view illustrating the knob assembly viewed from another direction.
Figure 14:
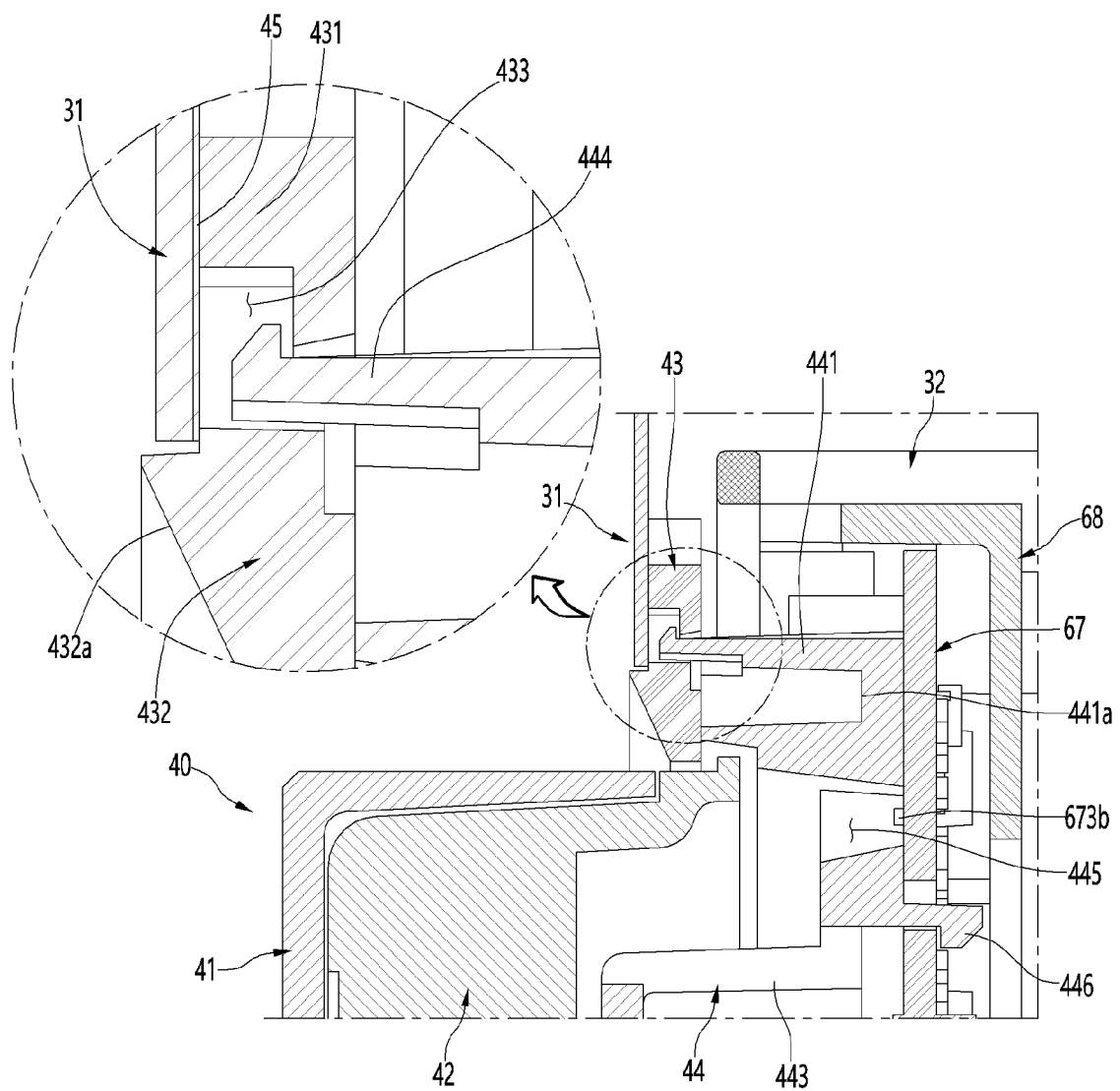
FIG. 14 is a cross-sectional view illustrating a coupling structure of the knob assembly.

FIG. 10 is an exploded perspective view illustrating the main PCB device 64, which is one configuration of the blender, FIG. 11 is an exploded perspective view illustrating a knob assembly, which is in one exemplary configuration of the blender, viewed from one direction, FIG. 12 is a perspective view illustrating a light guide, which is in one exemplary configuration of the knob assembly, FIG. 13 is an exploded perspective view illustrating the knob assembly viewed from another direction, and FIG. 14 is a cross-sectional view illustrating a coupling structure of the knob assembly.

As illustrated, the main PCB device 64 may include a main PCB 67 for controlling the operation of the blender 1 and a main bracket 68 on which the main PCB 67 is mounted.

In the main PCB 67 for example in the center of the main PCB 67, a knob rotation shaft 671 on which the knob assembly 40 is mounted may be provided. The knob rotation shaft 671 is coupled to the rotation center of the knob assembly 40, and when the knob assembly 40 is manipulated, the knob rotation shaft 671 may be rotated together. The main PCB 67 can select the operation mode of the blender 1, set the operation time, and set the rotation speed of the motor assembly 50 through the detection of rotation of the knob rotation shaft 671.

A buzzer 672 may be provided in the main PCB 67. The buzzer 672 may notify the operating state of the blender 1 by voice or sound. For example, when the power is applied to the blender 1, the buzzer 672 may output a specific sound to inform the user of an operation preparation state. A speaker may be provided in the main PCB 67 in place of the buzzer 672.

Meanwhile, the knob rotation shaft 671 may be disposed at the center of the main PCB 67, and a plurality of LEDs 673a and 673b may be disposed along the circumference of the knob rotation shaft 671. A plurality of the LEDs 673a and 673b may be disposed in a circular shape and may be composed of an outer LED 673a disposed on the outside and an inner LED 673b disposed on the inside.

The outer LED 673a may be disposed along the outer part 441 to be described below. A portion of the plurality of outer LEDs 673a may be turned on according to the manipulation of the knob assembly 40. In other words, when a user inputs a specific manipulation by manipulating the knob assembly 40, the outer LED 673a corresponding to the manipulation may be turned on. For example, if a user selects a specific operation mode set by rotating the knob assembly 40, the outer LED 673a corresponding to the operation mode may be turned on. Further, as another example, if a user inputs a specific time by rotating the knob assembly 40, the outer LED 673a corresponding to the specific time may be turned on. In addition, as another example, if the user rotates the knob assembly 40 to input a specific rotational speed, the outer LED 673a corresponding to the rotational speed may be turned on.

Meanwhile, a plurality of the outer LEDs 673a may not be disposed at equal intervals. In other words, if the object to be manipulated is different according to the rotation region of the knob assembly 40, the disposition interval of the outer LED 673a may be different for each region.

For example, in the section for setting the operation mode, the interval of the outer LED 673a is large, and in the section for setting the time or the rotational speed, the interval of the outer LED 673a is narrow and a larger number of the outer LEDs may be disposed. However, the plurality of outer LEDs 673a may be all disposed around a virtual circle, that is, along circumference of the outer part 441 of the knob assembly 40.

The inner LED 673b may be disposed along the inner part 442 of the knob assembly 40. The inner LED 673b may be disposed closer to the knob rotation shaft 671 than the outer LED 673a and may be disposed at a position corresponding to the inner part 442. In addition, all a plurality of the inner LEDs 673b may be disposed at equal intervals and may be disposed along a virtual circle, that is, along the inner part 442.

All the inner LEDs 673b may be turned on at once to display the state of the blender 1. For example, if power is supplied to the blender 1, the inner LED 673b is turned on to transmit a ready state of operation of the blender 1 to a user. The inner LED 673b may emit light of a different color from the outer LED 673a. In addition, the inner LED 673b may output various light colors according to circumstances.

A plurality of PCB coupling holes 674 may be formed around the knob rotation shaft 671. A guide coupling protrusion 446 to be described below may be inserted into the PCB coupling hole 674. The PCB coupling hole 674 may be provided in a number corresponding to a position corresponding to the guide coupling protrusion 446. For example, the PCB coupling hole 674 is radially disposed around the knob rotation shaft 671, and three PCB coupling holes 674 may be provided at equal intervals.

Meanwhile, four edges of the main PCB 67 may be provided with a PCB fastening member 675. The PCB fastening member 675 is configured to fixedly couple the main PCB 67 to the main bracket 68 and may be fastened to the PCB supporting portions 687a, 687b, and 687c, which will be described below.

The main bracket 68 allows the main PCB 67 to be fixedly mounted inside the inner case 32. The main bracket 68 may be formed in a rectangular frame shape, and the main PCB 67 may be fixedly mounted inside the main bracket 68.

The main bracket 68 may include a bracket border 681 of a rectangular frame shape. The bracket border 681 may have a predetermined width and may be formed along the circumference of the main PCB 67.

A lower end side of the bracket border 681 may be formed with a border incision portion 681a through which a wire connector connected with the main PCB 67 is entered.

In addition, the inner surface of the bracket border 681 is in contact with the circumference of the main PCB 67. In addition, a first border protrusion 683a and a second border protrusion 683b for restraining an end portion of the main PCB 67 may be provided on the inner surface of the bracket border 681. The first border protrusion 683a and the second border protrusion 683b are spaced apart, for example in the front-rear direction, from each other to constrain the front surface and the rear surface of the end portion of the main PCB 67.

In addition, the first border protrusions 683a are formed on both sides spaced apart from each other, and the second border protrusions 683b may be formed between a pair of the first border protrusions 683a. The first border protrusion 683a and the second border protrusion 683b may be provided on both sides of the bracket border 681 facing each other to restrain both ends of the main PCB 67.

An edge portion of the bracket border 681 may be formed with PCB supporting portions 687a, 687b, and 687c. The PCB supporting portions 687a, 687b, and 687c protrude to an inner region of the bracket border 681 and support an edge portion of the main PCB 67. In addition, the PCB fastening member 675 that is fastened through the main PCB 67 may be fastened to the PCB supporting portions 687a, 687b, and 687c. A plurality of the PCB supporting portions 687a, 687b, and 687c may be provided and may be formed at each edge of the bracket border 681.

On the outside of the bracket border 681, bracket coupling portions 684, 686a, and 686b may be formed to protrude outward. The bracket coupling portions 684, 686a, and 686b may include the first bracket coupling portion 684 formed on the lower surface of the main bracket 68 (as illustrated in FIG. 10), the second bracket coupling portion 686a and the third bracket coupling portion 686b which are formed on both side surfaces of the main bracket 68. In addition, the upper surface of the main bracket 68 (as illustrated in FIG. 10) may be restrained by being in contact with the inner upper surface of the inner case 32.

In detail, the first bracket coupling portion 684 may extend forward from a front end portion of the upper surface of the main bracket 68. A pair of first bracket coupling portions 684 may be spaced apart from each other in a right and left direction. For example, a pair of the first bracket coupling portions 684 may be disposed on both left and right sides of the upper surface of the main bracket 68.

Figure 15:
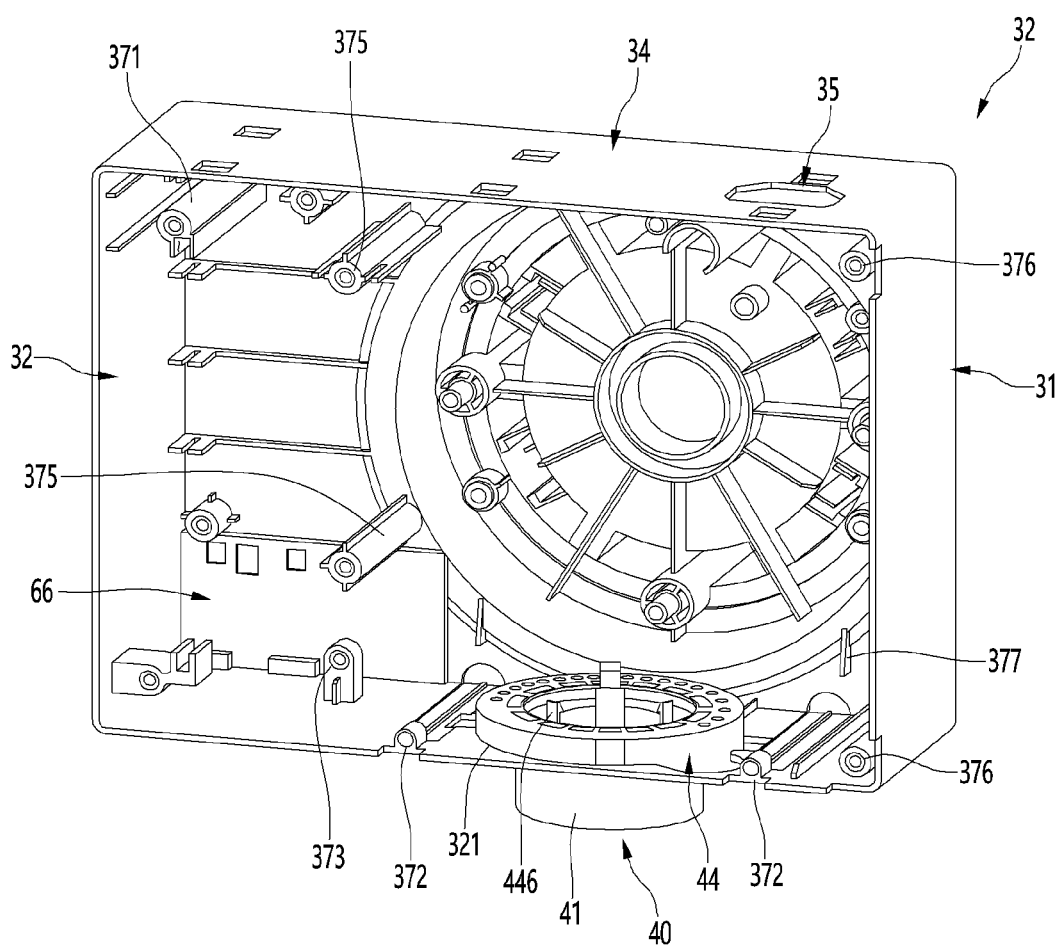
FIG. 15 is a perspective view illustrating a state where a knob assembly is disposed inside the main body.
Figure 16:
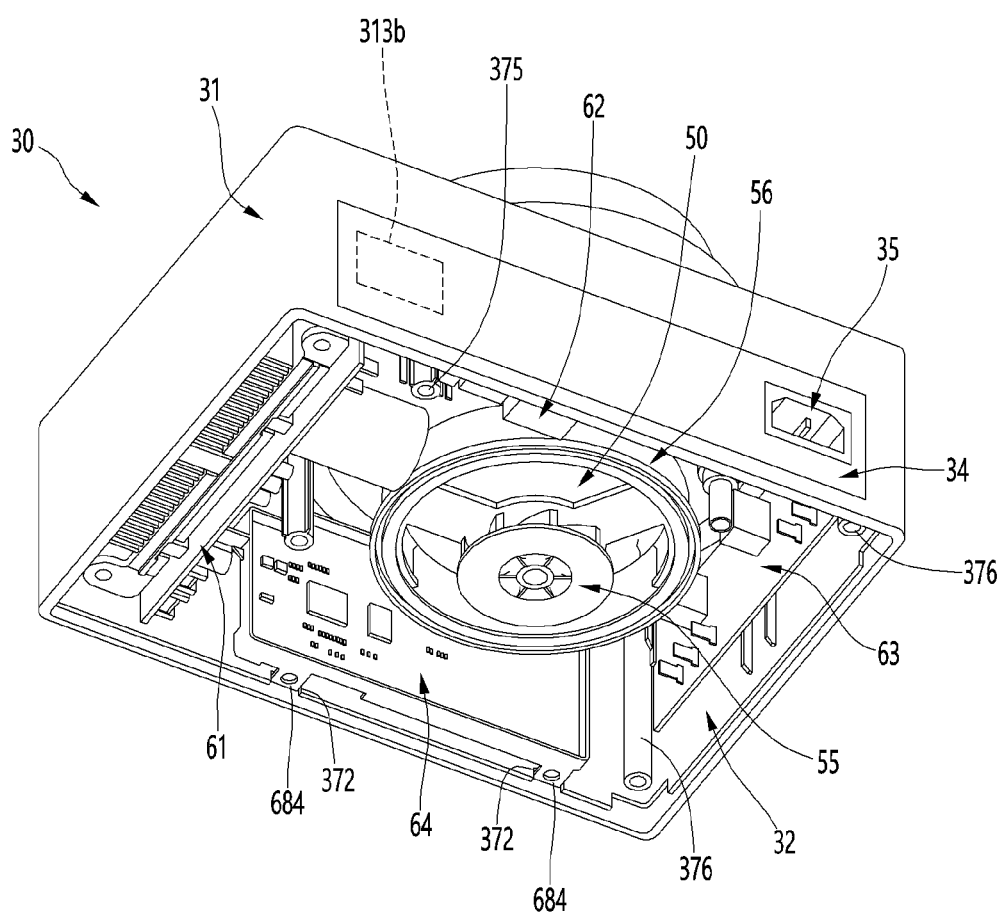
FIG. 16 is a perspective view illustrating a state where the main PCB device is mounted inside the main body.
Figure 17:
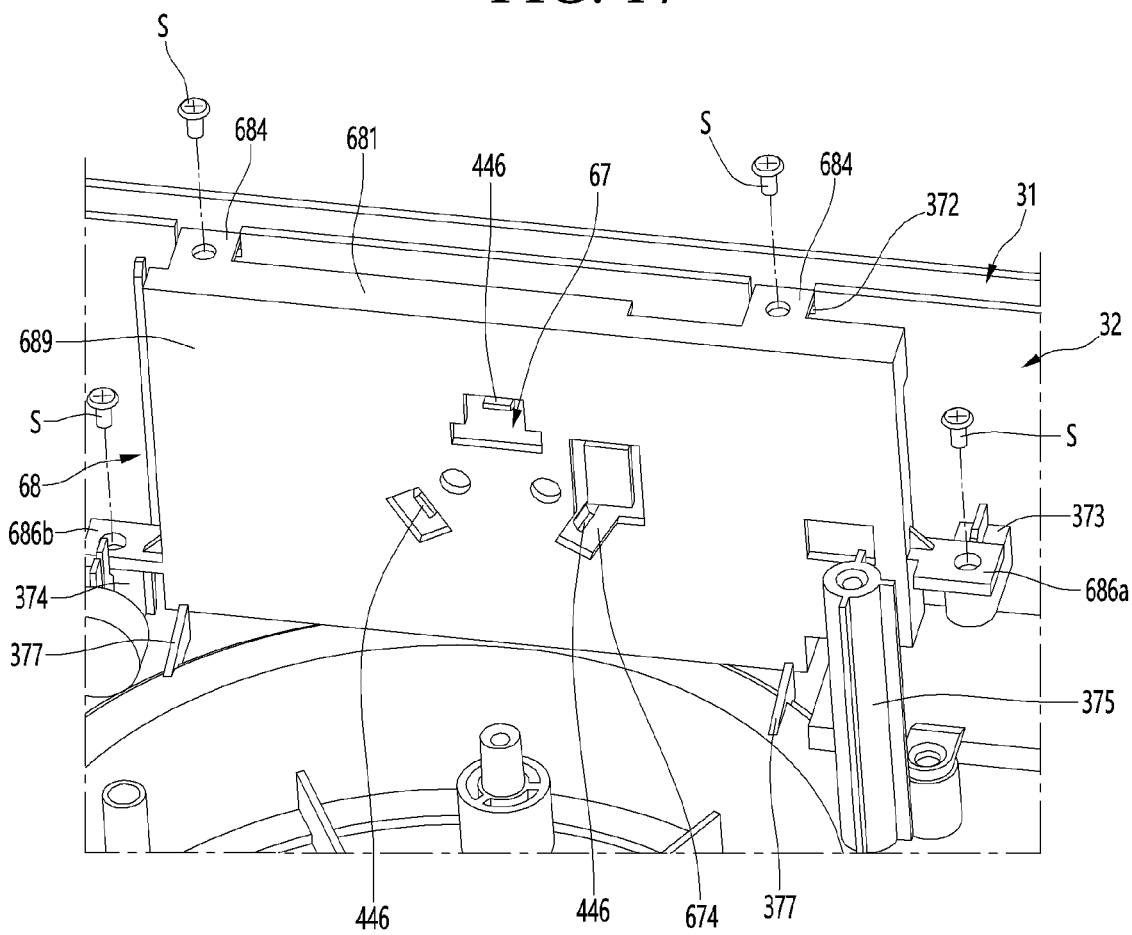
FIG. 17 is a partial perspective view illustrating a support structure of the main PCB device.

In addition, the first bracket coupling portion 684 may be extended toward the front. The extended first bracket coupling portion 684 may be coupled to the first mounting portion 372 (as illustrated in FIGS. 15-17) provided at the lower end of the inner case 32. The first mounting portion 372 may be located at a position corresponding to the first bracket coupling portion 684 and may support the first bracket coupling portion 684. In addition, a screw hole in which a screw S (as illustrated in FIG. 17) is fastened may be formed in the first bracket coupling portion 684. The screw S may be fastened to the first mounting portion 372 through the screw hole.

The second bracket coupling portion 686a may extend laterally from the side surface of the main bracket 68. In addition, a second mounting portion 373 (as illustrated in FIGS. 15 and 17) formed inside the inner case 32 may be located at a position corresponding to the second bracket coupling portion 686a and support the second bracket coupling portion 686a. In addition, a screw hole in which a screw is fastened may be formed in the second bracket coupling portion 686a. The screw may be fastened to the second mounting portion 373 through the screw hole.

The third bracket coupling portion 686b may extend laterally from the other side surface of the main bracket 68 opposite to the first bracket coupling portion 684. In addition, a third mounting portion 374 (as illustrated in FIG. 17) formed inside the inner case 32 may be located at a position corresponding to the third bracket coupling portion 686b and support the third bracket coupling portion 686b. In addition, a screw hole in which a screw is fastened may be formed in the third bracket coupling portion 686b. The screw may be fastened to the third mounting portion 374 through the screw hole.

Therefore, the main bracket 68 may be securely fixed to the inner case 32 on the entire circumferential surface, that is, on all four surfaces of the inner case 32. In other words, it is possible to maintain secure support and a fixed state of the knob assembly 40 mounted on the main PCB 67.

Meanwhile, the structure of the knob assembly 40 mounted on the main PC 67 will be described in more detail with reference to FIGS. 11 to 13.

The knob assembly 40 may be rotatably mounted on the main PCB 67 and protrude outward of the outer case 31 to be disposed to facilitate rotation manipulation of the user.

The knob assembly 40 may be configured as a whole including a knob 46, a knob ring 43, and the light guide 44. And the knob 46 includes a knob body 42 coupled with the knob rotation shaft 671, and a knob deco 41 coupled to the knob body 42.

Looking at this in more detail, the knob deco 41 forms a portion of the outer appearance of the knob assembly 40 and may particularly protrude outside the outer case 31 to form a portion directly contacted or manipulated by the user. The knob deco 41 may be made of the same material or a material having the same texture as the outer case 31 so that the outer appearance of the main body 30 has a unity. In addition, the knob deco 41 may be formed in a cylindrical shape with an opened rear surface, and the diameter of the knob deco 41 may be formed smaller than the diameter of the knob hole 312. Therefore, the knob deco 41 is located in the knob hole 312. In addition, the knob deco 41 may open rearward to form a body receiving space 411 in which the knob body 42 may be received.

The knob body 42 is coupled to the knob rotation shaft 671 and can rotate the knob rotation shaft 671 substantially by a user's manipulation, for example when the user rotates the knob 46, so that the rotation manipulation is input. The knob body 42 may also be formed in a cylindrical shape with an opened rear surface.

The knob body 42 may include, as a whole, a body inserting portion 421 that is inserted into the body receiving space 411, a first protruding portion 423 protruding outward from a rear end of the body inserting portion 421, and a second protruding portion 424 protruding from a rear end of the first protruding portion 423.

The body inserting portion 421 may be formed in a shape corresponding to the body receiving space 411. In addition, an adhesive groove 421A is formed on the front surface of the body inserting portion 421, and an adhesive is applied to the adhesive groove 421A and thus the body inserting portion may be bonded to or coupled to the knob deco 41 in a state of being inserted into the body receiving space 411.

The first protruding portion 423 may protrude outward to have a larger diameter than the body inserting portion 421. Therefore, a support surface 422 may be formed between the body inserting portion 421 and the first protruding portion 423. The support surface 422 is in contact with the rear end of the knob deco 41. In addition, the outer diameter of the first protruding portion 423 is formed to correspond to the outer diameter of the knob deco 41, thereby minimizing the protrusion of the coupling portion when the knob deco 41 and the knob body 42 are coupled to each other to have a sense of unity with each other.

The second protruding portion 424 may protrude outward to have a larger diameter than the first protruding portion 423. The outer diameter of the second protruding portion 424 may be formed larger than a ring opening 435 formed in the knob ring 43. The diameter of the first protruding portion 423 may be formed smaller than the diameter of the knob ring 43 to be located inside the ring opening 435, and thus the second protruding portion 424 is located at the rear of the ring opening 435 so that the knob body 42 is prevented from being displaced to the outside of the knob ring 43.

The inner center of the knob body 42 may be formed with a shaft coupling portion 425. The shaft coupling portion 425 extends in a hollow boss shape inside and forms a space in which the knob rotation shaft 671 may be inserted. The inner shape of the shaft coupling portion 425 is formed to correspond to the cross-sectional shape of the knob rotation shaft 671 so that, when rotating the knob body 42, the rotational force can be effectively transmitted to the knob rotation shaft 671.

In addition, a plurality of reinforcing ribs 426 extending radially may be formed on the outer surface of the shaft coupling portion 425. The reinforcing rib 426 may connect between the inner surface of the knob body 42 and the shaft coupling portion 425. A plurality of reinforcing ribs 426 may be formed and may be disposed at regular intervals to reinforce the knob body 42 as a whole.

Meanwhile, the knob body 42 may be made of a material capable of transmitting light or material that reflects light. A portion of the knob body 42 located at the rear of the knob deco 41 is located inside the knob hole 312 and inside the ring opening 435 and may emit light when the inner LED 673b is turned on. In the knob body 42, at least the first protruding portion 423 and the second protruding portion 424 may be made of a material capable of transmitting light or material that reflects light. Accordingly, when the inner LED 673b is turned on, a shiny band shape may be displayed along the circumference of the knob deco 41 when viewed from the outside.

The knob ring 43 may be located at a position corresponding to the knob mounting hole 321. In addition, the ring opening 435 may be opened in the center of the knob ring 43, and the knob body 42 may be located in the ring opening 435.

The knob ring 43 may be formed in a disc shape in which the ring opening 435 is formed in the center thereof and is formed in a size smaller than the size of the knob mounting hole 321 to be located inside of the knob mounting hole 321.

In addition, the knob ring 43 may include an exposed portion 432 formed along the circumference of the ring opening 435 and a case seating portion 431 formed along the circumference of the exposed portion 432.

The exposed portion 432 forms a circumference of the ring opening 435 and may be exposed to the outside through the knob hole 312. Accordingly, the inner diameter of the exposed portion 432 may be the same as or slightly larger than the inner diameter of the ring opening 435, that is, the diameter of the first protruding portion 423. The inner diameter of the exposed portion 432 is formed smaller than the outer diameter of the second protruding portion 424 to prevent the knob body 42 from falling out.

An inclined surface 432a (as illustrated in FIG. 14) may be formed on the front surface of the exposed portion 432. The inclined surface 432a is formed to be lowered toward the knob body 42, and light emitted through the outer LED 673a may be refracted to be directed to the outer surface of the knob body 42.

The case seating portion 431 may extend outward from the outer end of the exposed portion 432. In addition, the case seating portion 431 is formed to be stepped at the end portion of the exposed portion 432 to provide a surface on which the outer case 31 can be seated. Accordingly, the circumferential surface of the knob mounting hole 321 of the outer case 31 can be supported by the knob ring 43. The end portion of the exposed portion 432 and the case seating portion 431 may be formed to be stepped by a height corresponding to the thickness of the outer case 31.

In addition, the case seating portion 431 may be provided with an adhesive member 45 (as illustrated in FIG. 14). The adhesive member 45 may allow the case seating portion 431 and the outer case 31 to be bonded to each other. The knob assembly 40 may be partially fixed to the outer case 31 by the adhesive member 45. The adhesive member 45 may be provided in an adhesive sheet, a tape, or a form to which the adhesive is applied.

The outer end of the knob ring 43 may be formed with a ring guide 434 extending toward the rear, that is, toward the light guide 44. The ring guides 434 may be provided one on each of the left and right ends facing each other and may be received in the guide grooves 321a of the inner case 32. Therefore, the assembled knob assembly 40 can be placed in the correct position of the inner case 32.

Ring fastening grooves 433 may be formed in the case seating portion 431. The ring fastening groove 433 may be formed at a plurality of positions facing each other and may be disposed at equal intervals along the knob ring 43. The ring fastening groove 433 may be formed such that the guide hook 444 of the light guide 44 is inserted, and the knob ring 43 and the light guide 44 may be securely coupled to each other by coupling between the guide hook 444 and the ring fastening groove 433.

Meanwhile, the knob ring 43 may be made of a material capable of transmitting light, and at least the exposed portion 432 exposed through the knob hole 312 may be made of a material capable of transmitting light. Accordingly, the light of the outer LED 673a emitted through the light guide 44 may be transmitted, and when a specific outer LED 673a is turned on among the plurality of outer LEDs 673a, the light may be transmitted through the corresponding exposed portion 432 and displayed.

The light guide 44 forms the rearmost end of the knob assembly 40 and allows the knob assembly 40 and the main PCB 67 to be substantially coupled. In addition, the light guide 44 is configured to guide light emitted from the outer LED 673a and the inner LED 673b in a state of being in close contact with the main PCB 67.

As illustrated in FIGS. 12 and 13, the light guide 44 is composed of a ring-shaped outer part 441 and a ring-shaped inner part 442, and the inner part 442 may be located within the outer part 441.

In addition, a guide hook 444 extending forward may be formed around the outer part 441. The guide hook 444 may be located at a position corresponding to the ring fastening groove 433. For example, the guide hooks 444 may be located at both left and right sides and upper and lower ends, respectively, and may be formed at opposite positions, respectively. If the guide hook 444 is fastened to the ring fastening groove 433, the front surface of the light guide 44 can be in close contact with the rear surface of the knob ring 43.

In addition, a light hole 441b may be formed, e.g. as a through-hole, in the outer part 441. The light holes 441b are respectively formed at positions corresponding to the outer LEDs 673a and may be formed to pass through the front and rear surfaces of the outer part 441. In addition, the light hole 441b may be formed to have a size that can receive the outer LED 673a.

The light hole 441b is formed to have a larger opening size at the rear surface of the outer part 441 than the size of the outer LED 673a, and the outer LED 673a may be located inside the light hole 441b. In addition, the light hole 441b is formed such that the inner diameter thereof becomes narrower from the rear surface of the outer part 441 toward the front surface of the outer part 441 so that the light emitted from the outer LED 673a may be concentrated toward the front and transmitted through the exposed portion 432 of the knob ring 43 to be displayed in the form of a spot. In other words, the light hole 441b prevents light emitted from the corresponding outer LED 673a from spreading widely and may be clearly displayed on the exposed portion 432 of the knob ring 43 to be visible to the user.

A plurality of light holes 441b may be continuously disposed along the outer part 441. Meanwhile, a blocking portion 441a in which the light hole 441b is not formed may be formed in the outer part 441. The blocking portion 441a is a portion that prevents the light of the outer LED 673a from being transmitted, and the knob body 42 has to be rotated to at least a point passing through the blocking portion 441a so that the manipulation of the knob assembly 40 may be effectively input and the outer LED 673a may be turned on. Therefore, the blocking portion 441a may be disposed along the outer part 441 and formed over a set angle to both left and right sides based on an vertical extension line passing the center of the light guide 44.

The inner part 442 is spaced apart from and is inside the outer part 441, and a plurality of connecting portions 447 may be formed between the inner part 442 and the outer part 441. The connecting portions 447 may be spaced apart from each other at regular intervals. Accordingly, a guide opening 445 through which the inner LED 673b is transmitted may be formed between the outer part 441, the inner part 442, and the neighboring connecting portions 447.

The guide openings 445 may be formed at positions corresponding to the inner LEDs 673b, respectively. In addition, at least one inner LED 673b is located in the guide opening 445 so that light emitted from the inner LED 673b may be guided forward through the guide opening 445. The position of the guide opening 445 corresponds to a rear end portion of the knob body 42, that is, a position corresponding to the second protruding portion 424, and thus, the guide opening may be formed so that the light emitted from the inner LED 673b illuminates the rear end of the knob body 42.

Meanwhile, a plurality of guide coupling protrusions 446 extending rearward may be formed on the inner circumference of the inner part 442. The guide coupling protrusion 446 may be formed at a position corresponding to the PCB coupling hole 674 formed in the main PCB 67. A plurality of guide coupling protrusions 446 may be formed and may extend from the rear end of the inner part 442 to the rear to be inserted into the PCB coupling hole 674. The guide coupling protrusion 446 is formed in a hook shape and may be inserted and fastened to the PCB coupling hole 674 so that the front surface of the main PCB 67 and the rear surface of the light guide 44 can be coupled to be in close contact with each other. Thus, the knob assembly 40 is connected to or coupled to the main PCB 67 by the guide coupling protrusion 446 being coupled to or inserted into the PCB coupling hole 674.

If the light guide 44 is coupled to be in close contact with the main PCB 67, the outer LED 673a may be located inside the light hole 441b of the outer part 441, and the inner LED 673b may be located inside the guide opening 445. Therefore, the light emitted from the outer LED 673a and the inner LED 673b is guided through the light guide 44 and directed forward.

A guide extension portion 443 extending forward may be formed on the inner circumference of the inner part 442. In addition, the guide extension portion 443 may extend to the inside of the knob body 42. An axial through-hole 443a is formed at an end portion of the guide extension portion 443, and the knob rotation shaft 671 may pass through the axial through-hole 443a and be coupled with the shaft coupling portion 425 of the knob body 42. The axial through hole may extend in front-rear direction of the main body.

With this structure, the knob assembly 40 is mounted on the main PCB 67 and guides the light emitted from the outer LED 673a and the inner LED 673b of the main PCB 67.

Hereinafter, with reference to the drawings, the mounting structure of the main PCB device 64 will be described.

Figure 18:
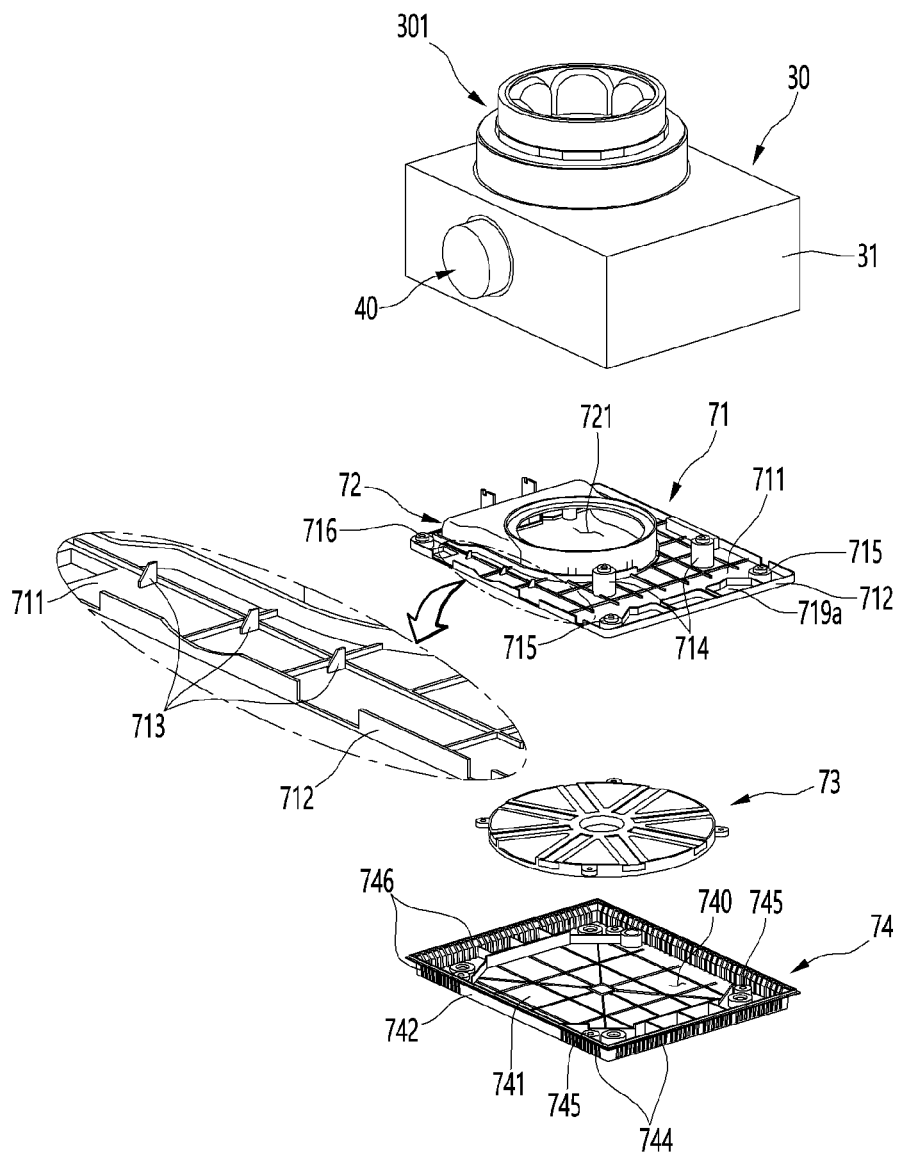
FIG. 18 is an exploded perspective view illustrating a state where a bottom plate and a bottom cover are disassembled to the main body.
Figure 19:
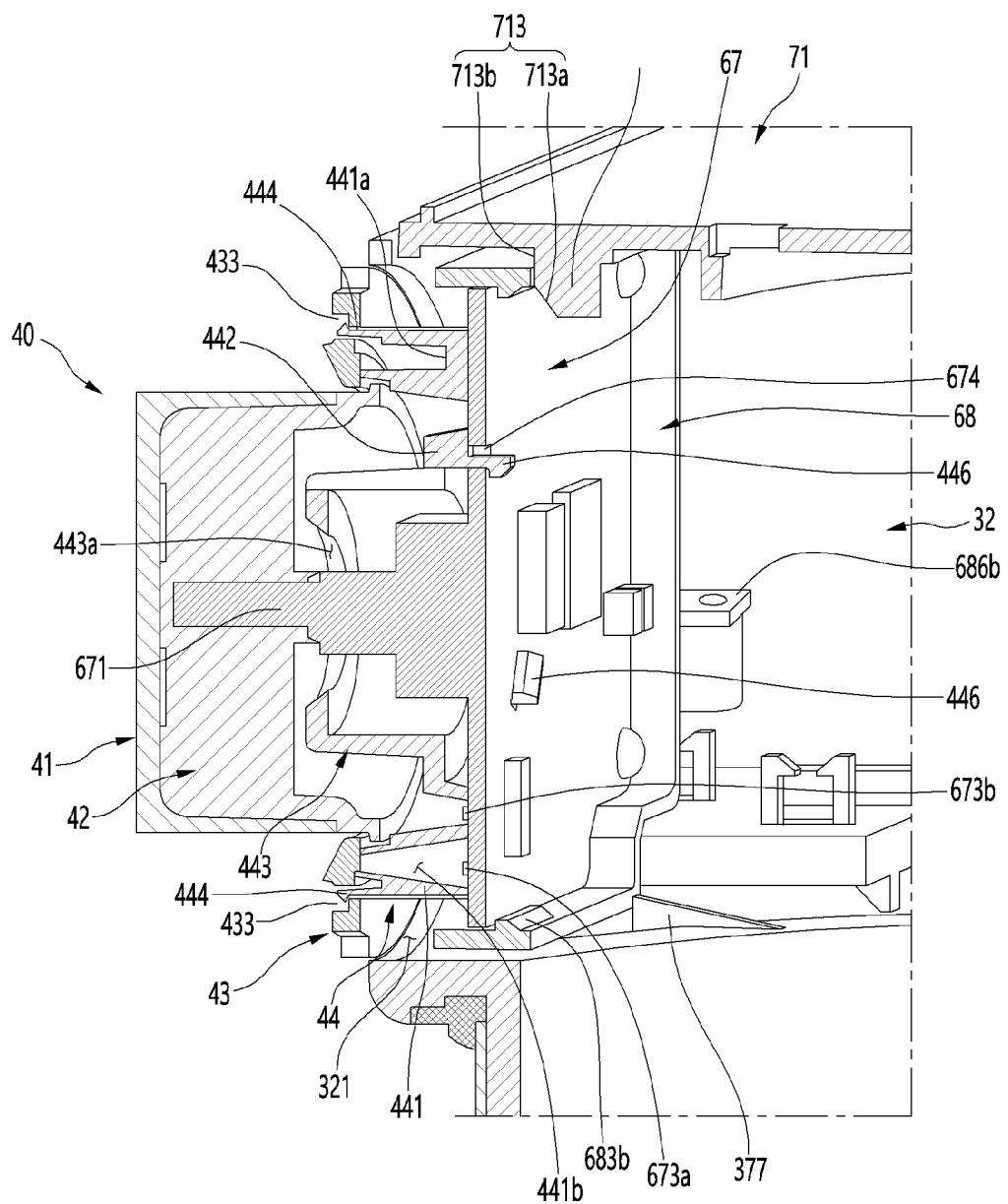
FIG. 19 is a cut-away perspective view illustrating the support structure of the knob assembly and the main PCB device

FIG. 15 is a perspective view illustrating a state where a knob assembly is disposed at the main body, FIG. 16 is a perspective view illustrating a state where the main PCB device is mounted inside the main body, FIG. 17 is a partial perspective view illustrating a support structure of the main PCB device, FIG. 18 is an exploded perspective view illustrating a state where a bottom plate and a bottom cover are disassembled to the main body, and FIG. 19 is a cut-away perspective view illustrating the support structure of the knob assembly and the main PCB device.

As illustrated in the FIGS., the knob assembly 40 may be disposed inside the knob mounting hole 321 and may be fixedly mounted on the main PCB device 64 fixed inside the inner case 32. Therefore, if a force is applied to the knob assembly 40, the force may be transmitted to the main PCB device 64, and therefore, the main PCB device 64 has to have a secure mounting structure so that the knob assembly 40 is not pushed backward.

The main PCB device 64 may be disposed on the front side of the inner case 32, that is, one surface of the inner case on which the main PCB 67 is mounted. In addition, the bracket coupling portions 684, 686a, and 686b of the main PCB device 64 are coupled to the inner case 32 so that the main PCB device 64 can be securely and fixedly mounted on the inner case 32. In this case, the main PCB device 64 may be fixedly mounted on the inner case 32 while the main PCB 67 is mounted on the main bracket 68.

In detail, a pair of the first bracket coupling portions 684 may be seated on the first mounting portion 372 at the lower end of the inner case 32. The first mounting portion 372 may be recessed in a shape corresponding to the first bracket coupling portion 684 and protrude inward to support the first bracket coupling portion 684. Further, a screw S passing through the screw hole of the first bracket coupling portion 684 is fastened to the first mounting portion 372 so that the lower end of the main PCB device 64 may be fixed.

Meanwhile, the upper end of the main PCB device 64 may be supported in a state of being in close contact with the inner upper surface of the inner case 32. The upper surface of the main PCB device 64 may be supported by the upper surface of the inner surface of the inner case 32 without a separate coupling structure and may be constrained by the upper supporter 377.

The upper supporter 377 may be formed to protrude downward from the inner upper surface of the inner case 32. A pair of upper supporters 377 may be spaced apart on both left and right sides and can support the upper end of the main PCB device 64 from the rear. Therefore, it is possible to prevent the upper end of the main PCB device 64 from falling off and the inner PCB device from being pushed backward.

The upper supporter 377 is formed to be higher in height from the rear toward the front, that is, toward the main PCB device 64, and the front end of the upper supporter 377 may be formed to be perpendicular to the upper surface of the inner case 32 to be in close contact with the rear surface of the main PCB device 64.

The second bracket coupling portion 686a may be supported by a second mounting portion 373 protruding rearward from an inner front surface of the inner case 32. In addition, a screw S passing through the screw hole of the second bracket coupling portion 686a is fastened to the second mounting portion 373 to constrain one side end of the main PCB device 64.

The display device 66 may be disposed above or at an upper side of the second mounting portion 373, so the second mounting portion 373 has a structure that protrudes from below the display device 66 to prevent interference of the display device 66. In addition, the main PCB 67 and the main bracket 68 also have a structure that prevents interference with the display device 66 because the edge of one side corresponding to the display device 66 is recessed.

The third bracket coupling portion 686b may be supported by a third mounting portion 374 protruding downward from the inner upper surface of the inner case 32. Then, the screw S passing through the screw hole of the third bracket coupling portion 686b is fastened to the third mounting portion 374 to constrain the other end of the main PCB device 64.

By the above structure, the main PCB device 64 has both upper and lower ends, and both left and right ends which are constrained to the inner case 32 and can maintain a securely fixed state. Accordingly, the knob assembly 40 mounted on the main PCB device 64 may maintain a mounting state, and the main PCB device 64 may not be displayed or the position thereof may not be changed due to impact and load applied when the knob assembly 40 is manipulated, and the main PCB device may maintain a secure mounting state.

Meanwhile, the main bracket 68 constituting the main PCB device 64, as illustrated in FIG. 17, may have a structure in which a bracket rear surface 689 shielding at least a portion of the main PCB 67 from the rear is formed. In addition, some components protruding rearward from the main PCB 67 may be opened to be exposed through the rear surface of the main bracket 68.

In addition, the knob assembly 40 may be mounted on the main PCB 67 in a state where the main PCB device 64 is mounted, and the knob assembly 40 may be separated from the main PCB 67 if necessary.

The motor assembly 50 is mounted inside the main body 30, and an opened lower surface of the inner main body 30 may be shielded by the base plate 71. In addition, an air guide 72 may be provided on the upper surface of the base plate 71, and a wireless power device 73 may be provided on the lower surface of the base plate 71. In addition, the lower surface of the base plate 71 on which the wireless power device 73 is mounted may be shielded by the bottom cover 74.

Looking at this in more detail, the base plate 71 may include a plate-shaped plate portion 711 corresponding to the opened lower surface of the inner case 32 and the plate border portion 712 around the plate portion 711. The base plate 71 is coupled with the inner case 32 to shield the opened lower surface of the inner case 32. The plate border portion 712 is in contact with the lower end of the inner case 32.

Looking at the coupling structure between the inner case 32 and the base plate 71, a plurality of bosses 371, 375, and 376 may be formed inside the inner case 32 for coupling with the base plate 71. The plurality of bosses 371, 375, and 376 may extend toward the opened lower surface from the upper surface inside the inner case 32.

In addition, a plurality of fastening portions 714, 715, and 716 may be formed in the corresponding base plate. Screws for coupling the base plate 71 may pass through the plurality of fastening portions 714, 715, and 716. The base plate 71 may be coupled to the inner case 32 through the fastening of the screw.

The plate portion 711 may be provided with a plurality of reinforcing ribs which intersect with each other as a whole so that the strength with which the air guide 72 and the wireless power device 73 may be mounted provides on a plate-shaped base plate 71.

Each of the left and right ends of the plate portion 711 is formed with a plate suction port 719a and a plate discharge port 719b, respectively, to be opened. The plate suction port 719a may be located vertically below the inverter PCB device 61, and the plate discharge port 719b may be received inside the air guide 72.

In addition, the plate portion 711 may be provided with a lower supporter 713. The lower supporter 713 may be formed at positions corresponding to the rear surface and the lower end of the main PCB device 64 and may support the lower end of the main PCB device 64 from the rear.

The lower supporter 713 may be formed to protrude upward and may be extended upward to be in contact with the rear surface of the main PCB device 64. A plurality of the lower supporters 713 may be formed spaced apart at regular intervals, and at least both left and right ends of the main bracket 68 may be supported from the rear.

Meanwhile, the lower supporter 713 may include an inclined portion 713a formed to be inclined downward from an extended upper end, and a vertical portion 713b vertically extending from the inclined portion 713a to the bottom plate 71.

The inclined portion 713a prevents the lower supporter 713 from interfering with the lower surface of the main bracket 68 when the bottom plate 71 is mounted and may guide so that the main bracket 68 naturally is located between the plate border portion 712 and the lower supporter 713. In addition, the vertical portion 713b is in contact with the lower end of the rear surface of the main bracket 68 to support the main PCB device 64 from the rear.

Meanwhile, when the assembly of the bottom plate 71 is completed in a state where the main PCB device 64 is mounted on the inner case 32, as illustrated in FIG. 19, the upper end of the rear surface of the main PCB device 64 may be supported by the upper supporter 377, and the lower end of the rear surface of the main PCB device 64 may be supported by the lower supporter 713. In other words, the main PCB device 64 can be supported so as not to be pushed backward by the upper supporter 377 and the lower supporter 713.

Therefore, even if the knob assembly 40 is pushed backward in a situation where the user manipulates the knob assembly 40 or in another situation where the impact is applied to the knob assembly 40, due to the upper supporter 377 and the lower supporter 713, the main PCB device 64 may maintain the position thereof and will not be pushed backward.

Meanwhile, the air guide 72 may be mounted on the bottom plate 71. In addition, the guide hole 721 may be opened at an upper end of the air guide 72. If the bottom plate 71 is coupled to the inner case 32, the lower end of the motor assembly 50 may be seated around the guide hole 721, and the cooling fan 55 may be inserted through the guide hole 721.

The wireless power device 73 may have a structure capable of receiving power supply by induced electromotive force when the blender 1 is to be used wirelessly. In other words, the wireless power device 73 may include a ferrite core radially disposed with respect to the center thereof, and a coil wound in a disc shape on a lower surface of the ferrite core.

The wireless power device 73 is formed to fill most of the space between the suction guide 719c and the discharge guide 719d and may be substantially placed on the undermost surface of the blender 1.

Therefore, if the induction is operated after the blender 1 is located in a home appliance where induced electromotive force may be generated, such as induction, power is supplied to the blender 1 through the wireless power device 73. To this end, the communication device 36 has a structure capable of wirelessly communicating with the induction, and an operation for supplying power to the induction can be controlled by the communication device 36. Accordingly, the blender 1 is located at a specific location of the induction and is aligned to a position where power can be supplied to the wireless power device 73, and then can be operated wirelessly by user manipulation.

Meanwhile, the bottom cover 74 is coupled to the lower surface of the base plate 71, shields the base plate 71 from below to shield the wireless power device 73 and to form a lower surface of the blender 1.

The bottom cover 74 may include a plate-shaped bottom plate 741 and a bottom border 742 extending upward along the circumference of the bottom plate 741. The bottom plate 741 may be formed in a slightly smaller rectangular shape than the size of the opened lower surface of the outer case 31. In addition, the upper end of the bottom border 742 may be coupled with the lower end of the outer case 31. The bottom border 742 may be formed to be inclined to connect the circumference of the bottom plate 741 and the lower end of the outer case 31.

The bottom plate 741 may be formed with a cover coupling hole 745 on which a screw for coupling with the base plate 71 is fastened. The cover coupling holes 745 may be formed in pairs on each of the left and right sides of the bottom plate 741.

Meanwhile, a cover suction port 744 and a cover discharge port 746 may be formed in the bottom cover 74. Therefore, if the cooling fan 55 is rotated by the rotation of the motor assembly 50, outside air is suctioned through the cover suction port 744 and flows into the inside of the main body 30, and can cool the components inside the main body 30, in particular, the motor assembly 50 and the PCB devices disposed on four surfaces inside the inner case 32 until the outside air is discharged to the cover discharge port 746 through the air guide 72.

Hereinafter, with reference to the drawings, the manipulation of the knob assembly 40 having the above structure will be described in more detail.

Figure 20:
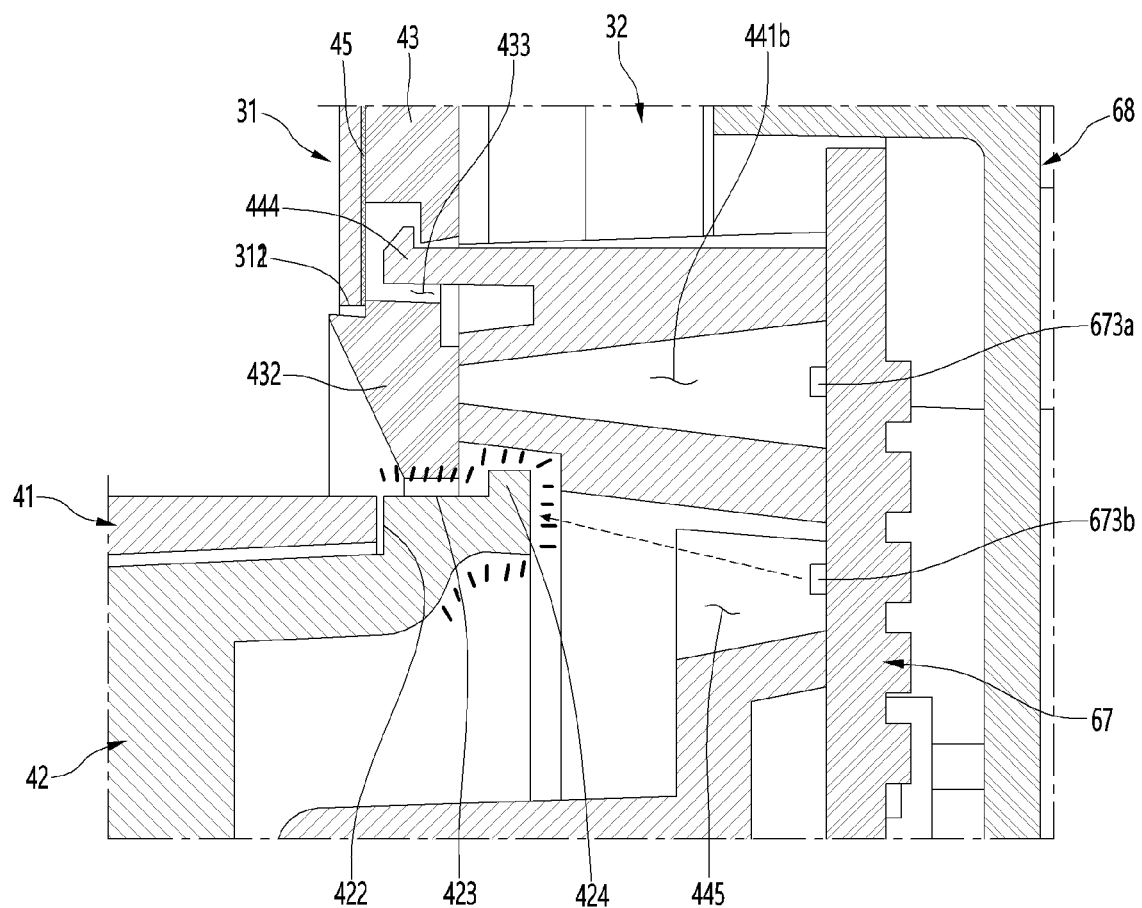
FIG. 20 is a cross-sectional view illustrating a light emitting state in a state where the power is supplied to the blender and is waiting for an operation.
Figure 21:
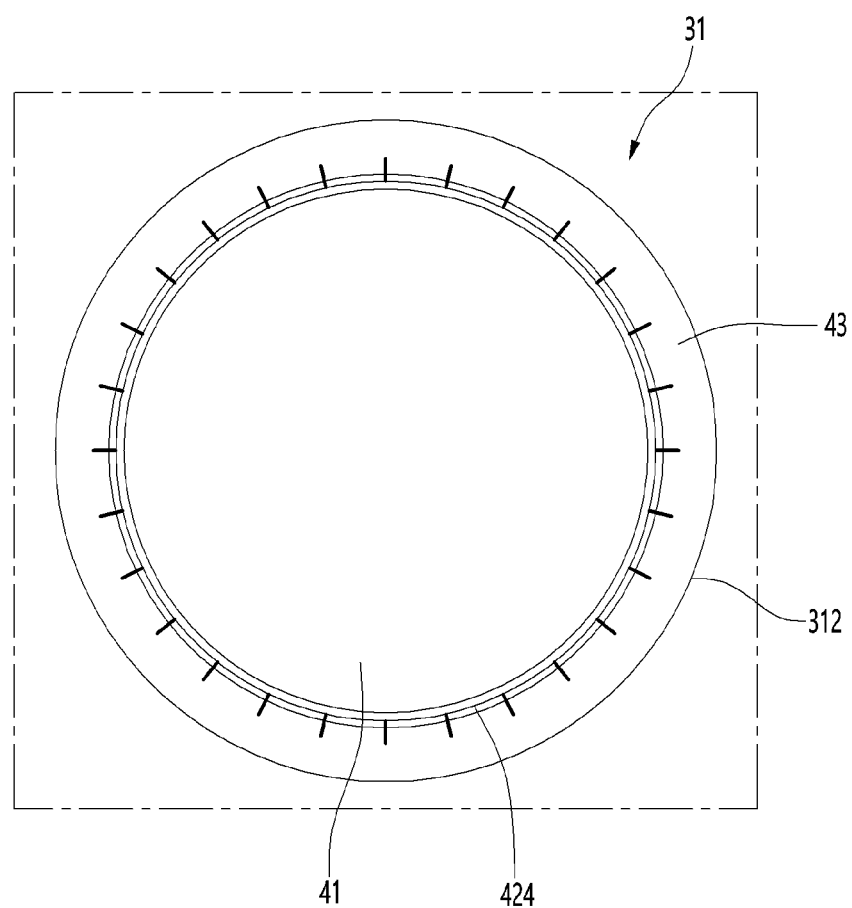
FIG. 21 is a partial perspective view illustrating a state around the knob assembly in the state of FIG. 20.

FIG. 20 is a cross-sectional view illustrating a light emitting state in a state where the power is supplied to the blender and is waiting for an operation, and FIG. 21 is a partial perspective view illustrating a state around the knob assembly in the state of FIG. 20.

As illustrated, the blender 1 may display a specific state of the blender 1 through a knob hole 312 on the front surface. For example, if power is applied to the blender 1 to be in an operable state, the light may be emitted in a band shape along the circumference of the knob assembly 40.

In detail, the inner LED 673b may be turned on to display a specific state of the blender 1. A plurality of inner LEDs 673b are all turned on, and light may be emitted through the guide opening 445. The light guided forward by the guide opening 445 intensively illuminates the rear end of the knob body 42, that is, the second protruding portion 424.

The position of the second protruding portion 424 is located on the inner surface of the knob ring 43, and thus the circumference of the rear end of the knob assembly 40 exposed through the knob hole 312 is illuminated. In other words, as illustrated in FIG. 21, all regions around the rear end of the knob assembly 40 exposed through the knob hole 312 are illuminated. Therefore, it can be displayed to the user in a shiny band shape around the knob assembly 40, and it can be visualized to the user that the blender 1 is ready for operation.

In a state where the blender 1 is ready for operation, a user may input a manipulation command for the operation to the blender 1 by rotating the knob assembly 40.

Of course, not only when the power is applied to the blender 1, but also when an error of a specific operation or an abnormal state of the blender 1 is generated, the inner LED 673b may be turned on and displayed as illustrated in FIG. 21. Of course, the blender 1 can be visualized in a state as illustrated in FIG. 21 even in other specific states.

In addition, if the inner LED 673b can express various colors, the state of the blender 1 may be determined by the color represented by the inner LED 673b.

Figure 22:
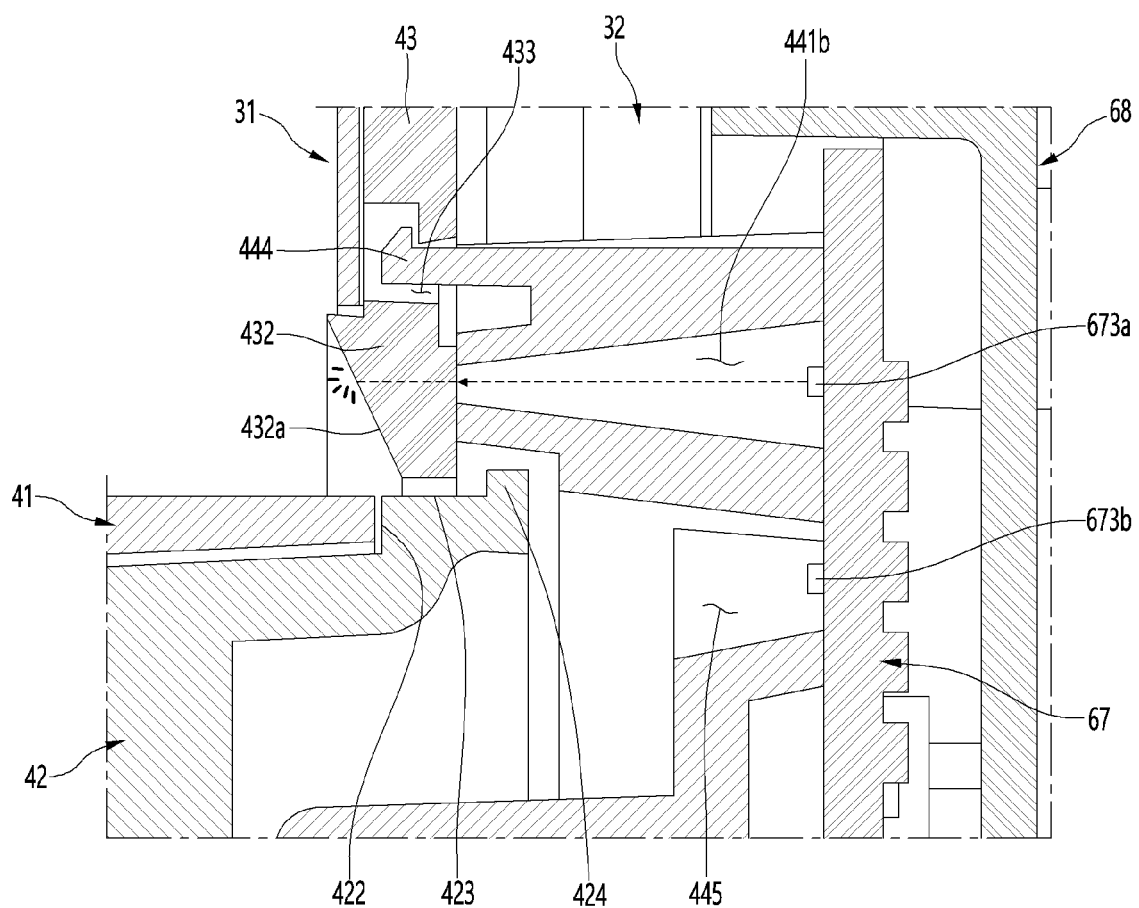
FIG. 22 is a cross-sectional view illustrating a light emitting state in a state where a specific manipulation is selected by manipulating the knob assembly.
Figure 23:
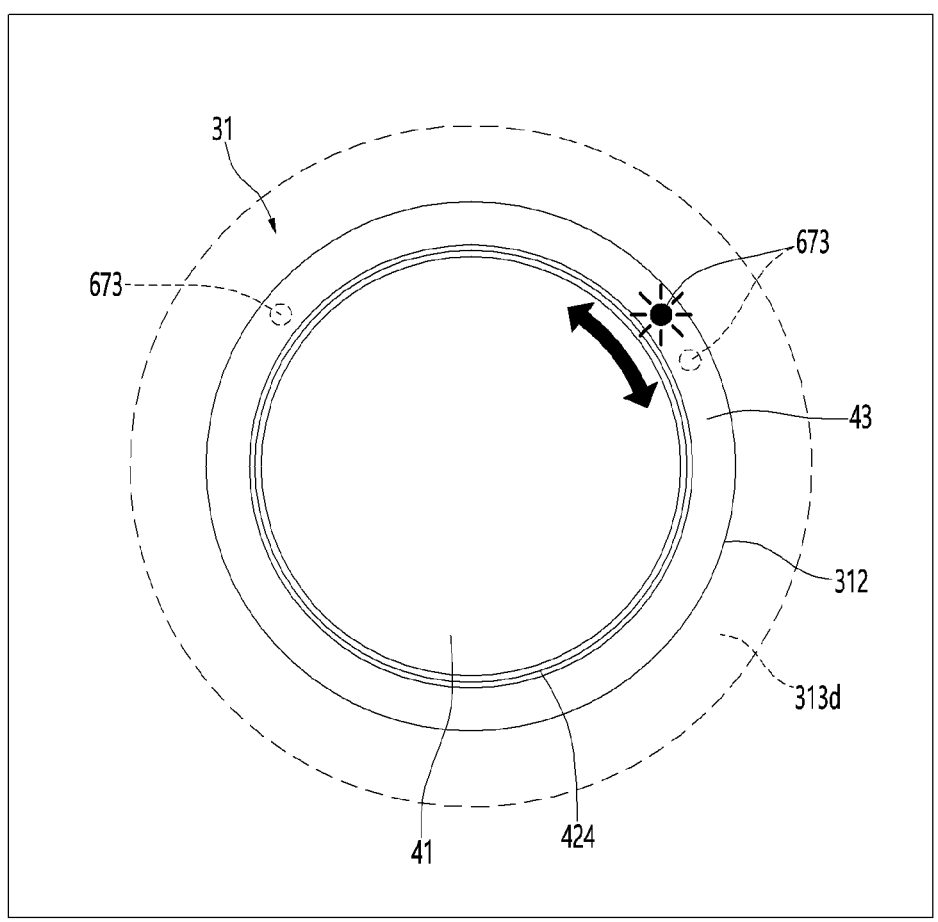
FIG. 23 is a partial perspective view illustrating a state around the knob assembly in the state of FIG. 22.

FIG. 22 is a cross-sectional view illustrating a light emitting state in a state where a specific manipulation is selected by manipulating the knob assembly, and FIG. 23 is a partial perspective view illustrating a state around the knob assembly in the state of FIG. 22.

As illustrated, the blender 1 may display the current operation state on the exposed portion 432 exposed through the knob hole 312. The knob assembly 40 may select a manipulation according to the degree of rotation and may input other manipulations according to the rotation direction of the knob assembly 40.

For example, when the knob assembly 40 is rotated in the forward direction, the operating time or rotational speed of the motor assembly 50 may be input, and when the knob assembly 40 is rotated in the reverse direction, by selecting the set operation mode of the blender 1, the blender 1 can be automatically operated in the selected mode according to the programmed operation condition.

Meanwhile, a manipulation display portion 313d may be formed around the knob hole 312 to allow the user to more easily rotate the knob assembly 40. The manipulation display portion 313d may be formed on the surface of the outer case 31 by surface processing such as printing or etching or may be provided with a printed film or sheet attached.

If the user rotates the knob assembly 40, a specific outer LED 673a selected from the plurality of outer LEDs 673a may be turned on according to the rotation amount of the knob assembly 40. If the outer LED 673a is turned on, light is guided toward the knob ring 43 through the light hole 441b to be concentrated. Accordingly, light emitted from the outer LED 673a is concentrated at a corresponding position of the knob ring 43 so that light can be emitted in the form of a spot.

Accordingly, the user can recognize a specific operation, and the blender 1 may be operated according to an operation command selected through the rotation manipulation of the knob assembly 40.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described.

What is claimed is:

1. A blender comprising:
   a main body including an outer case forming an outer appearance and an inner case received inside the outer case;
   a jar to be seated on the main body and provided with a blade for crushing food;
   a motor assembly provided inside the inner case to generate rotational power of the blade;
   a main printed circuit board (PCB) device provided inside the inner case;
   a knob rotation shaft is mounted on the main PCB device and
   a knob assembly mounted on the knob rotation shaft and protruding outwardly from the outer case so that the knob assembly is manipulatable by a user to select an operation of the blender,
   a plurality of light emitting diodes (LEDs) disposed on the main PCB device configured to emit light toward a circumference of the knob assembly, and
   wherein the knob assembly includes:
   a knob body coupled with the knob rotation shaft,
   a knob ring including a knob hole penetrated by the knob body and mounted at the knob hole, and
   a light guide to guide the light emitted from the plurality of LEDs, and
   wherein the knob ring is made of a material that transmits the light of the plurality of LEDs.

2. The blender of claim 1,
   wherein the light guide is formed with a coupling protrusion coupled to the main PCB device, and
   the light guide is in contact with the main PCB device to receive the plurality of LEDs.

3. The blender of claim 1,
   wherein the plurality of LEDs include
   a plurality of inner LEDs disposed corresponding to a circumference of the light guide to emit light toward a rear end of the knob body, and
   a plurality of outer LEDs disposed outside the circumference of the light guide corresponding to the plurality of inner LEDs to emit light toward the knob ring.

4. The blender of claim 3
   wherein the light guide includes
   an outer part formed along the knob ring at a position corresponding to the knob ring,
   an inner part formed to have an outer diameter smaller than an inner diameter of the outer part,
   a plurality of light holes penetrating the outer part at positions corresponding to the plurality of outer LEDs, and
   a guide opening formed between the outer part and the inner part corresponding to the plurality of inner LEDs.

5. The blender of claim 4,
wherein the plurality of light holes are formed so that an inner diameter of a light hole becomes smaller going from a front of the light hole towards a rear of the light hole.

6. The blender of claim 4,
wherein an outer LED is received in an opened rear of the light hole, and an opened front of the light hole is adjacent to the knob ring.

7. The blender of claim 4,
wherein a corresponding outer LED among the plurality of outer LEDs turns on when the knob assembly is manipulated to select the operation of the blender.

8. The blender of claim 4,
wherein all the plurality of inner LEDs is turned on to indicate a state of the blender.

9. The blender of claim 4,
wherein the guide opening formed at a position corresponding to a rear end portion of the knob body so that the light emitted from the inner LEDs illuminate the rear end of the knob body.

10. The blender of claim 4,
wherein the knob body is made of a material capable of transmitting light or material that reflects light.

11. The blender of claim 1,
wherein a plurality of the LEDs is circularly disposed with respect to the rotating shaft.

12. The blender of claim 1,
wherein a knob hole is formed on the outer case, and a knob mounting hole is formed on the inner case,
the knob body penetrates the knob hole and knob mounting hole and protrudes toward the front of the main body.

13. The blender of claim 1,
wherein the knob ring is exposed between the knob hole and knob body, and
at least a portion exposed through the knob hole is made of a material capable of transmitting light emitted from the LEDs through the light guide.

14. The blender of claim 13,
when a specific outer LED is turned on among the plurality of LEDs, the light is transmitted through the corresponding knob ring and displayed.

15. The blender of claim 1,
wherein the knob ring further includes:
an exposed portion formed along the circumference of the ring opening;
a case seating portion formed along the circumference of the exposed portion.

16. The blender of claim 15,
the exposed portion is exposed to the outside through the knob hole of the outer case,
an inclined surface is formed on the front surface of the exposed portion, and the inclined surface is formed to be lowered toward the knob body, and light emitted through the LEDs is refracted to be directed to the outer surface of the knob body.

17. The blender of claim 15,
the case seating portion extends outward from the outer end of the exposed portion, and is configured to support the circumferential surface of the knob mounting hole of the outer case.

18. The blender of claim 17,
the end portion of the exposed portion and the case seating portion is formed to be stepped by a height corresponding to the thickness of the outer case.

19. The blender of claim 1,
wherein the main PCB device includes
a main PCB on which the knob rotation shaft to which the knob assembly is coupled is mounted, and
a main bracket on which the main PCB is fixedly mounted and which is fixed to the inner case.

20. The blender of claim 19,
wherein the main bracket is formed to receive the main PCB, and
includes a plurality of bracket coupling portions fastened to a mounting portion formed at the inner case.

* * * * *